US012674684B2

(12) United States Patent
Xiao

(10) Patent No.: US 12,674,684 B2
(45) Date of Patent: Jul. 7, 2026

(54) METHOD AND APPARATUS FOR GENERATING JUNCTION PLANE, DEVICE, AND STORAGE MEDIUM

(71) Applicant: TENCENT TECHNOLOGY (SHENZHEN) COMPANY LIMITED, Shenzhen (CN)

(72) Inventor: Tongxing Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 169 days.

(21) Appl. No.: 18/591,137

(22) Filed: Feb. 29, 2024

(65) Prior Publication Data

US 2024/0200979 A1 Jun. 20, 2024

Related U.S. Application Data

(63) Continuation of application No. PCT/CN2023/105644, filed on Jul. 4, 2023.

(30) Foreign Application Priority Data

Aug. 19, 2022 (CN) .......................... 202210998820.9

(51) Int. Cl.
 *G01C 21/00* (2006.01)
(52) U.S. Cl.
 CPC ................................ *G01C 21/3867* (2020.08)
(58) Field of Classification Search
 None
 See application file for complete search history.

(56) References Cited

U.S. PATENT DOCUMENTS

| | | |
|---|---|---|
| 6,622,085 B1 | 9/2003 | Amita et al. |
| 2009/0080697 A1 | 3/2009 | Kishikawa et al. |
| 2010/0121886 A1 | 5/2010 | Koshiba et al. |
| 2011/0054783 A1 | 3/2011 | Kishikawa et al. |

(Continued)

FOREIGN PATENT DOCUMENTS

| | | |
|---|---|---|
| CN | 101163940 A | 4/2008 |
| CN | 108664016 A | 10/2018 |

(Continued)

OTHER PUBLICATIONS

Machine Translated JP-2006215378-A (Year: 2006).*

(Continued)

*Primary Examiner* — Anne Marie Antonucci
*Assistant Examiner* — Misa H Nguyen
(74) *Attorney, Agent, or Firm* — Anova Law Group, PLLC

(57) ABSTRACT

A method for generating a junction plane includes: determining a composite node junction including at least two single-node junctions according to road network data; obtaining a road plane of the composite node junction according to junction information of the composite node junction; respectively determining a junction plane of each of the at least two single-node junctions; generating a surrounding plane of the composite node junction according to the junction plane of each of the single-node junctions; and integrating the surrounding plane into the road plane to obtain a junction plane of the composite node junction.

18 Claims, 13 Drawing Sheets

(56) References Cited

U.S. PATENT DOCUMENTS

| | | | | |
|---|---|---|---|---|
| 2019/0347493 | A1 | 11/2019 | Chen et al. | |
| 2020/0256698 | A1* | 8/2020 | Shi ..................... | G01C 21/3867 |
| 2021/0356292 | A1 | 11/2021 | Lin | |
| 2022/0155097 | A1 | 5/2022 | Tsukamoto | |
| 2022/0284615 | A1* | 9/2022 | Wan ..................... | G06V 20/588 |

FOREIGN PATENT DOCUMENTS

| | | | | |
|---|---|---|---|---|
| CN | 110389992 | A | | 10/2019 |
| CN | 114049327 | A | | 2/2022 |
| CN | 115346012 | A | | 11/2022 |
| EP | 3693701 | A2 | | 8/2020 |
| JP | 2006215378 | A | * | 8/2006 |
| JP | 2009176223 | A | | 8/2009 |
| JP | 2019082431 | A | | 5/2019 |
| JP | 2021119501 | A | | 8/2021 |
| JP | 2022079170 | A | | 5/2022 |
| KR | 100579767 | B1 | | 5/2006 |
| KR | 20080070620 | A | | 7/2008 |

OTHER PUBLICATIONS

The Japan Patent Office (JPO) Notice of Reasons for Refusal for Application No. 2024-532544 Apr. 30, 2025 4 Pages (including translation).
The European Patent Office (EPO) The Extended European Search Report for Application No. 23854141.1 Mar. 18, 2025 8 Pages.
The World Intellectual Property Organization (WIPO) International Search Report for PCT/CN2023/105644 Oct. 25, 2023 6 Pages (including translation).

* cited by examiner

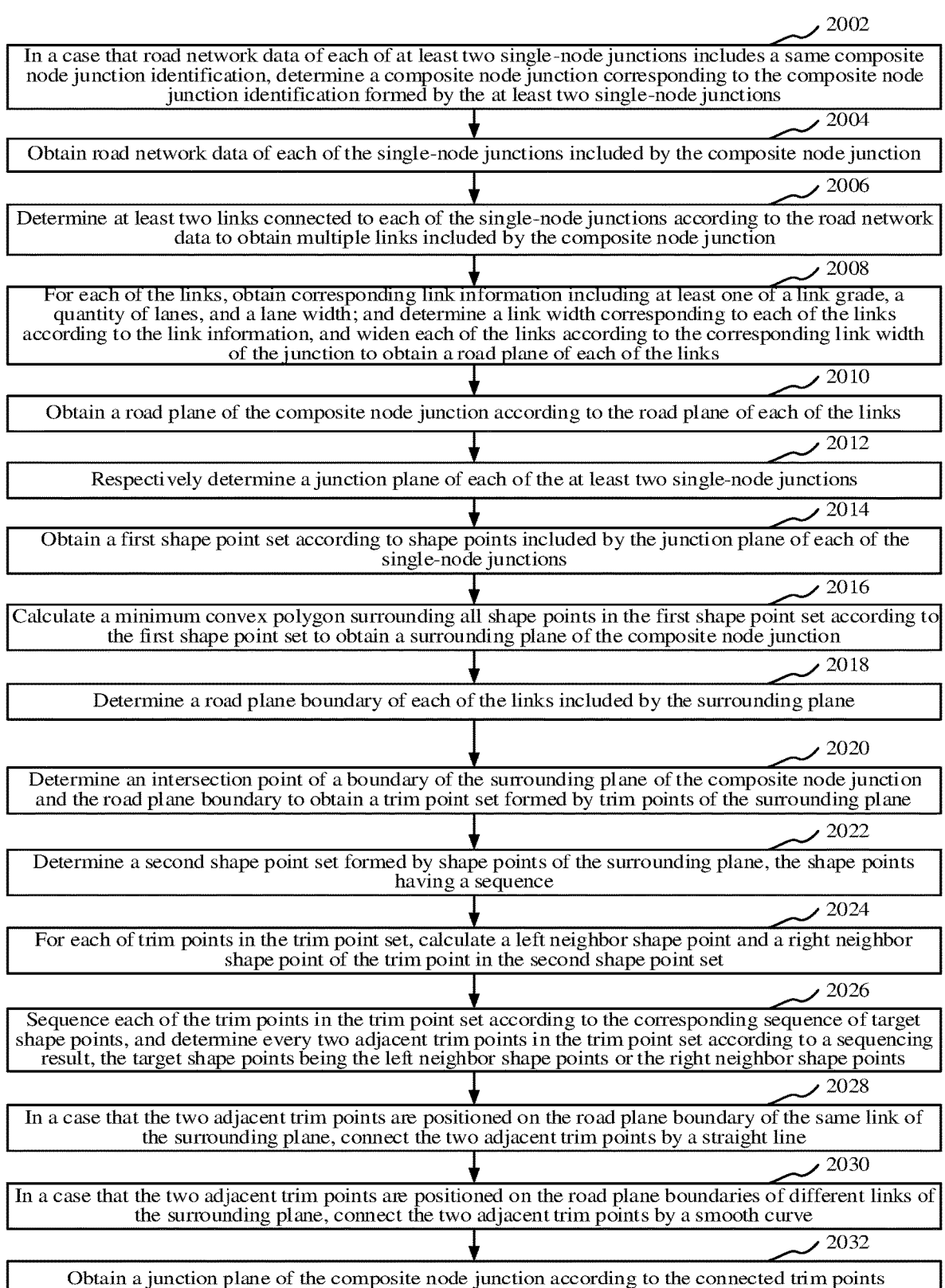

2002
In a case that road network data of each of at least two single-node junctions includes a same composite node junction identification, determine a composite node junction corresponding to the composite node junction identification formed by the at least two single-node junctions 2004
Obtain road network data of each of the single-node junctions included by the composite node junction 2006
Determine at least two links connected to each of the single-node junctions according to the road network data to obtain multiple links included by the composite node junction 2008
For each of the links, obtain corresponding link information including at least one of a link grade, a quantity of lanes, and a lane width; and determine a link width corresponding to each of the links according to the link information, and widen each of the links according to the corresponding link width of the junction to obtain a road plane of each of the links 2010
Obtain a road plane of the composite node junction according to the road plane of each of the links 2012
Respectively determine a junction plane of each of the at least two single-node junctions 2014
Obtain a first shape point set according to shape points included by the junction plane of each of the single-node junctions 2016
Calculate a minimum convex polygon surrounding all shape points in the first shape point set according to the first shape point set to obtain a surrounding plane of the composite node junction 2018
Determine a road plane boundary of each of the links included by the surrounding plane 2020
Determine an intersection point of a boundary of the surrounding plane of the composite node junction and the road plane boundary to obtain a trim point set formed by trim points of the surrounding plane 2022
Determine a second shape point set formed by shape points of the surrounding plane, the shape points having a sequence 2024
For each of trim points in the trim point set, calculate a left neighbor shape point and a right neighbor shape point of the trim point in the second shape point set 2026
Sequence each of the trim points in the trim point set according to the corresponding sequence of target shape points, and determine every two adjacent trim points in the trim point set according to a sequencing result, the target shape points being the left neighbor shape points or the right neighbor shape points 2028
In a case that the two adjacent trim points are positioned on the road plane boundary of the same link of the surrounding plane, connect the two adjacent trim points by a straight line 2030
In a case that the two adjacent trim points are positioned on the road plane boundaries of different links of the surrounding plane, connect the two adjacent trim points by a smooth curve 2032
Obtain a junction plane of the composite node junction according to the connected trim points

FIG. 20

METHOD AND APPARATUS FOR GENERATING JUNCTION PLANE, DEVICE, AND STORAGE MEDIUM

CROSS-REFERENCES TO RELATED APPLICATIONS

This application is a continuation application of PCT Patent Application No. PCT/CN2023/105644, filed on Jul. 4, 2023, which claims priority to Chinese Patent Application No. 2022109988209, entitled "METHOD AND APPARATUS FOR GENERATING JUNCTION PLANE, DEVICE, STORAGE MEDIUM AND PROGRAM PRODUCT", and filed with China National Intellectual Property Administration on Aug. 19, 2022, both of which are incorporated by reference in their entirety.

FIELD OF THE TECHNOLOGY

The present disclosure relates to the field of Internet technologies, and in particular, to a method and apparatus for generating a junction plane, a computer device, a storage medium and a computer program product.

BACKGROUND OF THE DISCLOSURE

With rapid development of computer technology and Internet technology, virtual map products, such as lane-level high-precision maps, ordinary maps and urban road models, for urban link condition simulation, have emerged one after another, bringing convenience to people's travel in daily life.

In some cases, it is necessary to use the original road network data to generate road elements, and especially in some cases of lack of high-precision map data in some regions, it is necessary to generate some road elements based on ordinary maps to obtain an effect like high-precision maps in a place where there is no high-precision map data. For regions being lack of high precision map data, a junction plane is one of the road elements required for generating virtual maps.

At present, morphology and topology data of the roads are needed for generating junction planes of composite node junctions, and additionally, path indication information is also needed. However, the path indication information is expensive to acquire, and has certain timeliness and a limited coverage range. That is, not only much original data is needed, but also poor robustness and high cost is expected, so it is difficult to generate the junction plane of the composite node junction automatically in a large range.

SUMMARY

According to a first aspect, the present disclosure provides a method for generating a junction plane. The method includes: determining a composite node junction including at least two single-node junctions according to road network data; obtaining a road plane of the composite node junction according to junction information of the composite node junction; respectively determining a junction plane of each of the at least two single-node junctions; generating a surrounding plane of the composite node junction according to the junction plane of each of the single-node junctions; and integrating the surrounding plane into the road plane to obtain a junction plane of the composite node junction.

According to a second aspect, the present disclosure further provides an apparatus for generating a junction plane. The apparatus includes: a determining module, configured to determine a composite node junction including at least two single-node junctions according to road network data; a road plane generating module, configured to obtain a road plane of the composite node junction according to junction information of the composite node junction; a single-node junction plane generating module, configured to respectively determine a junction plane of each of the at least two single-node junctions; a surrounding plane generating module, configured to generate a surrounding plane of the composite node junction according to the junction plane of each of the single-node junctions; and an integrating module, configured to integrate the surrounding plane into the road plane to obtain a junction plane of the composite node junction.

According to a third aspect, the present disclosure further provides a computer device. The computer device includes a memory and a processor. The memory stores computer-readable storage instructions, and the following operations are implemented in a case that the computer-readable storage instructions are executed by the processor: determining a composite node junction including at least two single-node junctions according to road network data; obtaining a road plane of the composite node junction according to junction information of the composite node junction; respectively determining a junction plane of each of the at least two single-node junctions; generating a surrounding plane of the composite node junction according to the junction plane of each of the single-node junctions; and integrating the surrounding plane into the road plane to obtain a junction plane of the composite node junction.

According to a fourth aspect, the present disclosure further provides a non-transitory computer-readable storage medium. The computer-readable storage medium stores computer-readable storage instructions. The following operations are implemented in a case that the computer-readable storage instructions are executed by a processor: determining a composite node junction including at least two single-node junctions according to road network data; obtaining a road plane of the composite node junction according to junction information of the composite node junction; respectively determining a junction plane of each of the at least two single-node junctions; generating a surrounding plane of the composite node junction according to the junction plane of each of the single-node junctions; and integrating the surrounding plane into the road plane to obtain a junction plane of the composite node junction.

BRIEF DESCRIPTION OF THE DRAWINGS

To describe the technical solutions of embodiments of the present disclosure more clearly, the following briefly introduces the accompanying drawings required for describing the embodiments. Apparently, the accompanying drawings in the following description show merely some embodiments of the present disclosure.

FIG. 20 is a schematic flowchart of generating a surrounding plane in one embodiment.

DESCRIPTION OF EMBODIMENTS

Figure 1:
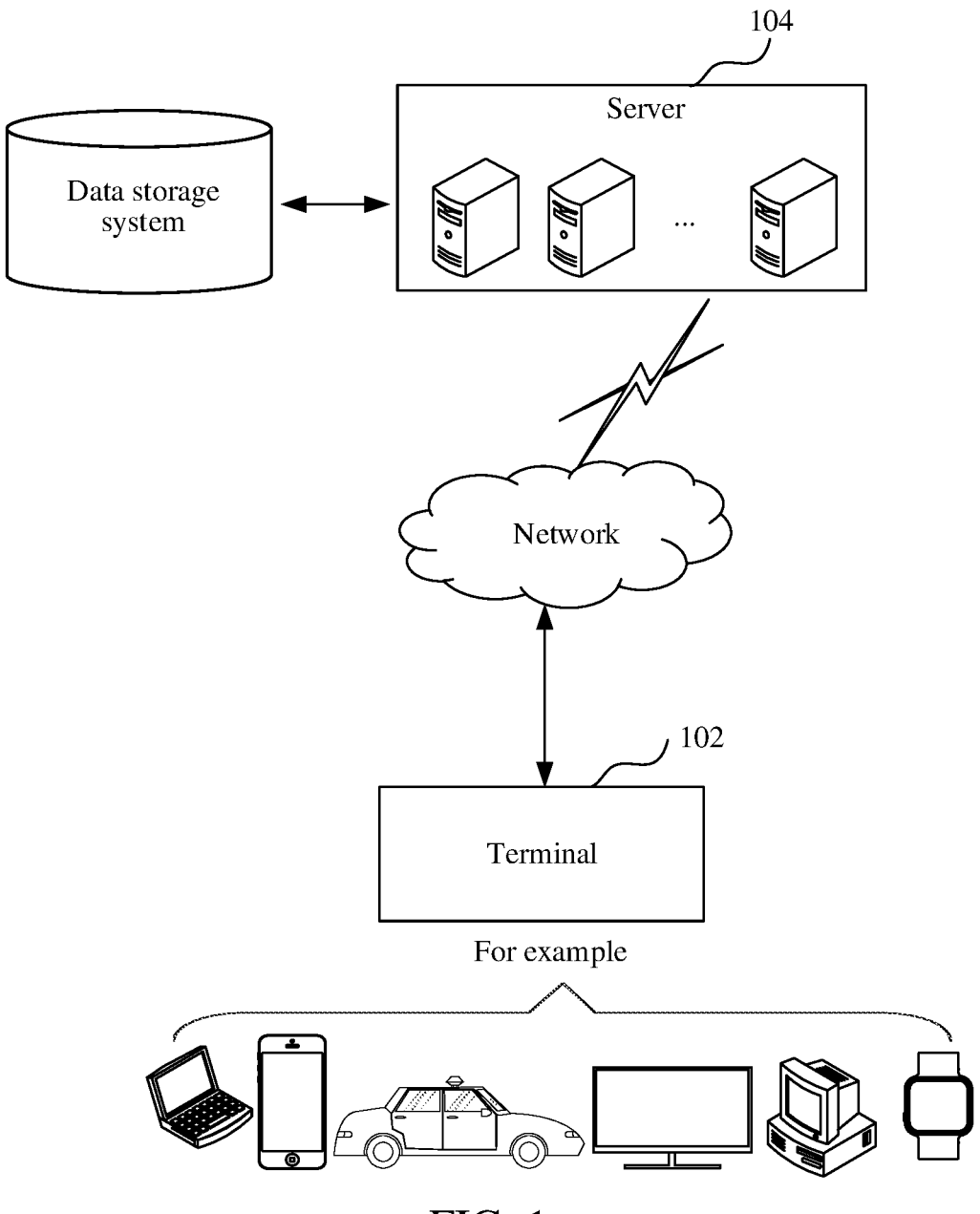
FIG. 1 is a diagram of an application environment of a method for generating a junction plane in an embodiment.

To make the objectives, technical solutions and advantages of the present disclosure clearer, the following further describes the present disclosure in detail with reference to accompanying drawings and embodiments. It is to be understood that the specific embodiments described herein are only used for explaining the present disclosure, and are not intended to limit the present disclosure.

A method for generating a junction plane provided by an embodiment of the present disclosure may be applied to various virtual map products such as high-precision virtual maps, ordinary-precision maps and urban road models, and may be used for visually showing a link region including multiple junctions. The method for generating a junction plane may be understood as a process of compiling original map data, that is, the method is used as a connecting link between the preceding and the following, so as to process and treat the original map data to generate a more compact and easier-to-use file or data. Data obtained through compiling may be provided for an upper level (such as map navigation, location technology and map rendering) to call. Exemplarily, the generated junction plane data of a composite node junction may provide base map data at a junction for a navigation engine, may enhance the visual effect of the navigation interface, and may provide data support for automatic drive under the decision making condition at a junction or an object, such as a driver, using an electronic map for decision making, so as to prevent a vehicle from running out of a junction range. Therefore, the accident occurring probability at the junction is reduced, and the safety of automatic drive is improved.

According to the method for generating a junction plane provided by the present disclosure, a junction plane of a single-node junction and a road plane or a junction plane of a composite node junction may be generated through road network data in an electronic map. In some examples, intelligent navigation route services may also be provided for driving objects such as drivers by using an intelligent traffic system based on the position information, the profile, etc. of the junction plane. Or, a terminal device may more actually and clearly show a high-precision three-dimensional image corresponding to the junction plane in a navigation application page or a map page by using computer vision technology, etc.

At present, the lane-level navigation mainly uses high-precision map data (the precision is at a decimeter level or a centimeter level). However, a coverage area of the high-precision map is limited, for example, in some cities, there is high-precision map data only in regions beyond the fifth ring, and there is no high-precision map data in regions in the fifth ring. In order to obtain an effect like a high-precision map in regions without high-precision map data, some road elements need to be generated by using an algorithm according to a standard precision map (i.e. an ordinary navigation map, the precision is at a 10 m level), and junction plane data of a composite node is used as one of the road elements, and needs to be generated through the ordinary road network data.

In some cases, a method for generating a junction plane of a composite node has a main defect that it relies on much original data, besides the link morphology and link topological data, path indication information (such as left turn, right turn and go straight) is also needed. However, the path indication information has high acquisition cost, has certain timeliness and a limited coverage range, and corresponding path indication information cannot be even acquired in some junctions. Therefore, such method has poor robustness, i.e., poor anti-interference performance. Human intervention is also needed in some special cases, the cost is high, and the junction plane of the composite node junction cannot be automatically generated in a large range.

Based on the above, in order to solve the above technical problems, an embodiment of the present disclosure provides a method for generating a junction plane. For a composite node junction including at least two single-node junctions, a road plane of the composite node junction only needs to be obtained according to junction information of the composite node junction. A surrounding plane of the composite node junction is generated according to the junction plane of each of the included single-node junctions. Then, the surrounding plane is integrated into the road plane, and the junction plane of the composite node junction may be obtained. The junction plane of the composite node junction may be simply and effectively generated at high quality on the premise of relying little original data, and no complicated calculative strategy needs to be introduced, so that an extreme case is avoided, and the robustness is high.

A method for generating a junction plane provided by an embodiment of the present disclosure may be applied to an application environment shown in FIG. 1. A terminal 102 communicates with a server 104 by using a network. A data storage system may store data to be processed by the server 104, such as respective original road network data of multiple single-node junctions included by the composite node junction. The road network data includes information such as links connected to each of the single-node junctions, a link grade, a link width and a quantity of lanes, and these road network data may be used for generating the junction plane of the composite node junction. The data storage system may be integrated onto the server 104, and may be placed on cloud or other servers.

In an embodiment, the method for generating a junction plane of the present disclosure may be implemented by the server 104. The server 104 determines the composite node junction, the composite node junction includes at least two single-node junctions, a road plane of the composite node junction is obtained according to the junction information of the composite node junction, and the junction planes of each of the at least two single-node junctions are respectively determined. Then, the server 104 generates a surrounding plane of the composite node junction according to the junction planes of each of the single-node junctions, and then integrates the surrounding plane into the road plane to obtain the junction plane of the composite node junction. In some embodiments, the terminal 102 may call the junction plane (boundaries of the junction plane correspond to point strings, i.e., a series of point coordinates) of the composite node junction generated by the server 104 to render and show the junction plane in a virtual map.

In some embodiments, an application program supporting map service may be installed and run on the terminal 102. The server 104 may be a server providing service for the application program. The terminal 102 realizes interaction with the server 104 based on the application program. The application program may be a map application, a navigation application, a location application or any one application program supporting junction display, such as a traffic transportation application and a game application requiring to call and display link junctions. It may be understood that in some embodiments, the junction plane of the composite node may be generated by the terminal. An execution body for generating a junction plane is not limited in embodiments of the present disclosure.

The terminal 102 may be but is not limited to various personal computers, notebook computers, smartphones, tablet computers, Internet of Things devices and portable wearable devices. The Internet of Things devices may be smart speakers, smart televisions, smart air conditioners, smart vehicle devices, etc. The smart vehicle devices may be vehicle navigation terminals, vehicle computers, etc. The potable wearable devices may be smartwatches, smart bracelets, headset devices, etc. The server 104 may be an independent physical server, may be a server cluster or a distributive system formed by multiple physical servers, and may further be a cloud service or a server cluster providing basic cloud computing service such as cloud server, cloud database, cloud computing, cloud function, cloud storage, network service, cloud communication, middleware service, domain name service, security service, content delivery networks (CDN), and big data and artificial intelligence platforms.

Figures 2, 3:
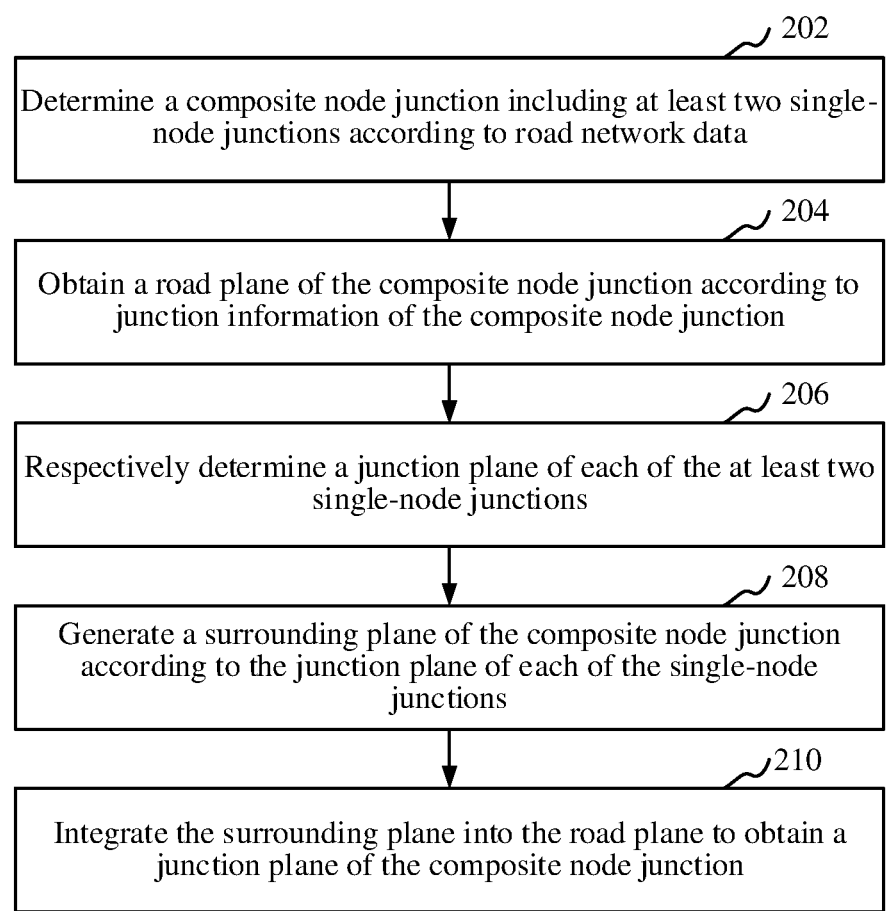
FIG. 2 is a schematic flowchart of a method for generating a junction plane in an embodiment.
FIG. 3 is a schematic diagram of a single-node junction in an embodiment.

In an embodiment, as shown in FIG. 2, a method for generating a junction plane is provided. This embodiment mainly describes with an example in which the method is applied to a computer device (such as a server 104) in FIG. 1, and the method specifically includes the following steps.

Step 202: A composite node junction is determined according to road network data, and the composite node junction includes at least two single-node junctions.

Road network data of a map is data for describing complicated roads. Junction is a road element formed by at least two roads through intersection. The junction may be expressed by at least one node in the road network data of a map. In an ordinary map, a road is generally expressed by a line segment without a width (hereinafter, a road/street is also called a link), is a line-shaped link, each segment is expressed by multiple sequentially arranged discrete position points, and one position point is one coordinate, such as a coordinate of latitude and longitude. At least two roads/ links intersect to form a node. That is, an intersection end point of at least two segments is recorded as a node, and the node represents a junction formed by links indicated by the at least two segments through intersection. According to the quantity of the included nodes, the junctions may be divided into single-node junctions and composite node junctions. The single-node junction refers to a junction expressed by a single node, and the composite node junction refers to a junction expressed by multiple nodes, i.e., a "big junction".

FIG. 3 is a schematic diagram of a single-node junction in an embodiment. As shown in FIG. 3, in the single-node junction, 4 links including link1 to link4 intersect to form a single-node junction A.

Figures 4, 5:
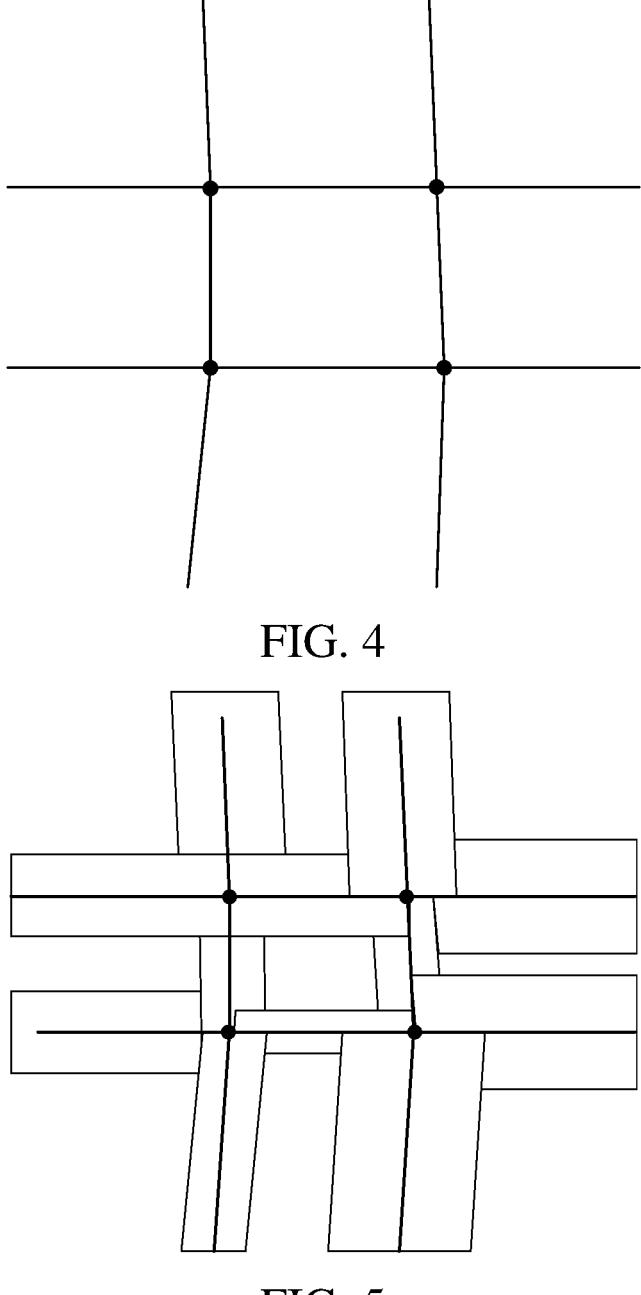
FIG. 4 is a schematic diagram of a composite node junction in an embodiment.
FIG. 5 is a schematic diagram of an effect of a road plane of a composite node junction in an embodiment.

FIG. 4 is a schematic diagram of a composite node junction in an embodiment. As shown in FIG. 4, the composite node junction includes four single-node junctions, and each of the single-node junctions is formed by 4 links through intersection which respectively form one single-node junction. Therefore, this composite node junction totally includes 12 links.

It may be understood that the quantity of links intersecting at each of the single-node junctions is at least two, and may be 3, 4, 6, 10, etc. It is not specifically limited in the present disclosure. The quantity of the single-node junction included by each composite node junction is at least two, and may be 3, 4, 5, etc., and it is not specifically limited in the present disclosure. Additionally, for the single-node junction and the composite node junction as shown in FIG. 3 and FIG. 4, the links are not necessarily in a perpendicular case. In practical application, the links may be not perpendicular to each other. It is not specifically limited in the present disclosure.

A computer device may determine a to-be-generated composite node junction of the junction plane from map data. The composite node junction may be a composite node junction being lack in high-precision data in a high-precision map, and may also be a to-be-generated composite node junction of a junction plane in an ordinary-precision map. The computer device may obtain known map road network data to obtain the road network data of each of the single-node junctions from map road network data. In a case that the road network data of the at least two single-node junctions include a same composite node junction identification, it shows that the at least two single-node junctions form a same composite node junction. The road network data of the composite node junction may be obtained by the road network data of these single-node junctions, so that the computer device may determine a composite node junction. The road network data of each of the single-node junctions may include the road network data of at least two links connected to each of the single-node junctions, and may further include a junction identification of the composite node junction where it is located. The road network data of each of the links may include a string of coordinate data (point strings), i.e., a series of discrete position points forming the link, may also include a junction identification of the single-node junction to which it is connected, and may also include link attributes of the link, such as a link width, a link grade, a link name and the quantity of the link lanes.

Step 204: A road plane of the composite node junction is obtained according to junction information of the composite node junction.

The junction information of the composite node junction includes junction information of the single-node junctions included by the composite node junction, for example, which single-node junctions are included by the composite node junction. The junction information of the composite node junction also includes the junction information of each of the single-node junctions included by the composite node junction. The junction information of each of the single-node junctions further includes link information of links connected to each of the single-node junctions. The link information includes but is not limited to the link grade, the quantity of lanes, etc. The road plane is a "plane" link obtained by widening the "line" link included by the composite node junction, and essentially is two link boundary data of the link. That is, the road plane of the link may be described by two link boundaries of the link.

For the composite node junction requiring junction plane generation, the computer device may obtain corresponding junction information, so as to determine the single-node junctions included by the composite node junctions, links forming each of the single-node junctions through interaction, link information of each of the links, etc. In order to obtain the junction plane of the composite node junction, the computer device needs to firstly generate the road plane of the composite node junction, and the road plane is generated according to the road plane of each of the links included by the composite node junction. The road plane of the composite node junction may be a set formed by road planes of each of the links included by the composite node junctions.

As mentioned above, in an original road network data of a map, each of the links is generally expressed by a segment without a width, and is a "line" link. In order to generate the road plane of the composite node junction, the computer device needs to widen the segment without the width into a road plane with a certain width. The widening basis may be the link information of the link, such as the link grade and the quantity of lanes. The lane grade, for example, may be the trunk link, the sub trunk link, the branched link, etc. The lane grade, for example, may also be first-class highway, second-class highway, third-class highway, fourth-class highway, etc. Links with different link information correspond to different widening widths. The computer device widens each of the links to the corresponding road plane according to the link widths. In some embodiments, the link information of the link may directly include the corresponding link width. The computer device widens each of the links to the corresponding road plane according to the link width. In some embodiments, the link width of each of the links may be identical. It may be understood that the road plane formed by widening each of the links respectively includes a road plane left side boundary and a road plane right side boundary. The link width for widening the link may be the link width at one side, and may be the link width at both the left side and the right side, and the link widths at two sides may be identical, and may also be different.

In an embodiment, Step 204 includes: Road network data of each of the single-node junctions included by the composite node junction is obtained. At least two links connected to each of the single-node junctions are determined according to the road network data to obtain multiple links included by the composite node junction. Corresponding link information including at least one of a link grade, a quantity of lanes, and a lane width is obtained for each of the links. A link width corresponding to each of the links is determined according to the link information. Each of the links is widened according to the corresponding link width to obtain a road plane of each of the links. The road plane of the composite node junction is obtained according to the road plane of each of the links.

In this embodiment, a link without a width may be widened based on the link information of the links included by the composite node junction to obtain a corresponding road plane, so that the road plane of the composite node junction may be simply and efficiently generated without the rely on other additional data or complicated strategies.

FIG. 5 is a schematic diagram of an effect of a road plane of a composite node junction in an embodiment. Referring to FIG. 5, after each of the links is widened towards two sides according to the corresponding link width in accordance with the link attribute information of each of the links included by the composite node junction as shown in FIG. 4, the road plane of the composite node junction is formed.

Step 206: A junction plane of each of the at least two single-node junctions is respectively determined.

As mentioned above, each of the single-node junctions is a node formed by at least two links through intersection, and the node represents one single-node junction. Therefore, the single-node junction is "point" data. In order to obtain the junction plane of the composite node junction, the computer device needs to firstly generate the junction plane of each of the single-node junctions included by the composite node junction, and expands the "point" data into "plane" data. The manner or specific algorithm of generating the junction plane of each of the single-node junctions is not limited in this embodiment of the present disclosure.

For example, in some embodiments, after the road plane of the composite node is obtained, for the road plane of each of the single-node junctions in the composite node junction, the computer device may outward extend the road plane of each of the links to a certain bias distance from each of the single-node junctions to obtain a perpendicular line (also called as a tangent line of the road plane) to the road plane. The perpendicular lines on the road plane of each of the links are connected to form a closed shape to be used as a junction plane of each of the single-node junctions.

For example, in some embodiments, the computer device may also determine an intersection point of two side boundaries of the road plane and the tangent line, and may determine a minimum convex polygon to be used as a junction plane of each of the single-node junctions according to the intersection points on the road plane of each of the links.

In the above manner, the bias distance is specified, and under some conditions, the shape of the junction plane may be abnormal, and may not be close to practice. Therefore, in order to ensure that the shape of the junction plane of each single node is close to practice and to really reflect the practical condition of the junction, the computer device may restrain the tangent line of each of the links connected to each of the single-node junctions. That is: (1) The tangent lines are perpendicular to the road plane. (2) The tangent lines do not intersect with each other or only intersect at a tangent line end point. Additionally, on the premise of meeting the above constraint conditions, the area of the junction plane region of the single-node junction may be restrained to be possibly small. The computer device may adopt any algorithms or strategies to realize the above constraint conditions, so as to ensure the shape of the junction plane of the single node to be close to the practical conditions. It is not limited in this embodiment of the present disclosure. Detailed description will be given below by using specific embodiments.

Figure 6:
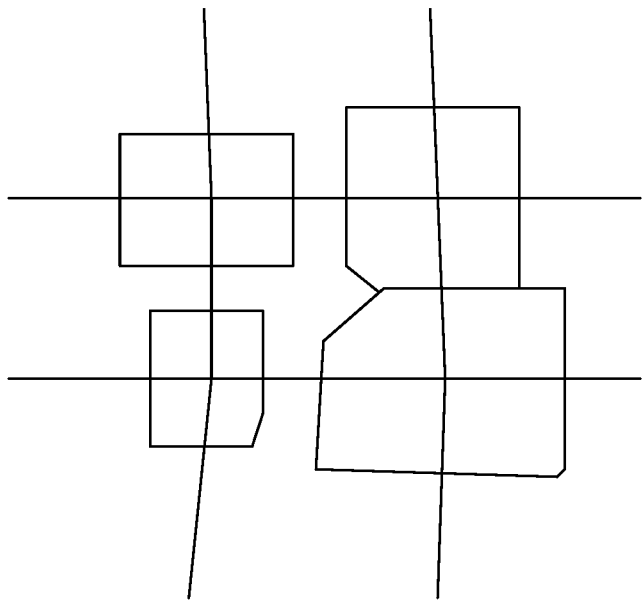
FIG. 6 is a schematic diagram of a junction plane of each single node generated in an embodiment.

FIG. 6 is a schematic diagram of a junction plane of each single node generated in the composite node junction in an embodiment. Referring to FIG. 6, for 4 single nodes included by the composite node junctions as shown in FIG.

4, the computer device respectively generates junction planes of each of the single nodes.

Step 208: A surrounding plane of the composite node junction is generated according to the junction plane of each of the single-node junctions.

The surrounding plane is in a closed shape formed by junction plane boundaries of the composite node junction. The junction plane boundaries are expressed by a string of ordered discrete position points, and these ordered discrete position points may be used for describing the junction plane boundaries of the composite node junction. Specifically, after the junction plane of each of the single-node junctions included by the composite node junction is obtained, the computer device generates a surrounding plane according to the junction plane of each of the single-node junctions, and the surrounding plane can surround the junction plane of each of the single-node junctions. Exemplarily, the surrounding plane is a minimum-area convex hull surrounding the junction plane of each of the single-node junctions, i.e., a convex hull junction plane. Exemplarily, the surrounding plane is a minimum-area convex hull surrounding the junction plane of each of the single-node junctions, and each boundary of the convex hull is perpendicular to the corresponding road plane. Exemplarily, the surrounding plane is a maximum-area irregular figure formed by all shape points of the junction plane of each of the single-node junctions. The surrounding plane is essentially a continuous ordered data point string capable of forming a closed shape.

In an embodiment, the operation of generating a surrounding plane of the composite node junction according to the junction plane of each of the single-node junctions includes: A first shape point set is obtained according to shape points included by the junction plane of each of the single-node junctions. A minimum convex polygon surrounding all shape points in the first shape point set is calculated according to the first shape point set to obtain the surrounding plane of the composite node junction.

As mentioned above, the junction plane of each of the single-node junctions is in a closed shape. The closed shape is formed by multiple shape points. It may be understood that the shape points are folding points on the boundaries forming the closed shape. After the computer device determines the junction plane of each of the single-node junctions included by the composite node junction, the shape points of the junction plane of each of the single-node junctions are collected to obtain the first shape point set. Then, the computer device calculates the minimum convex polygon surrounding all shape points in the first shape point set, and the minimum convex polygon is used as a surrounding plane of the composite node junction.

Figure 7:
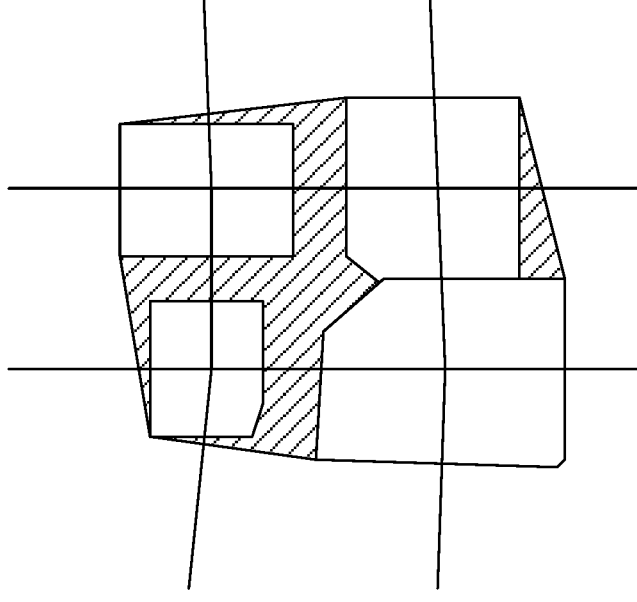
FIG. 7 is a schematic diagram of a surrounding plane of a composite node junction in an embodiment.

FIG. 7 is a schematic diagram of a surrounding plane of a composite node junction in an embodiment. As shown in FIG. 7, the composite node junction includes 4 single-node junctions, and the minimum convex polygon including all the shape points of the 4 single-node junctions is used as the surrounding plane of the composite node junction.

Figure 8:
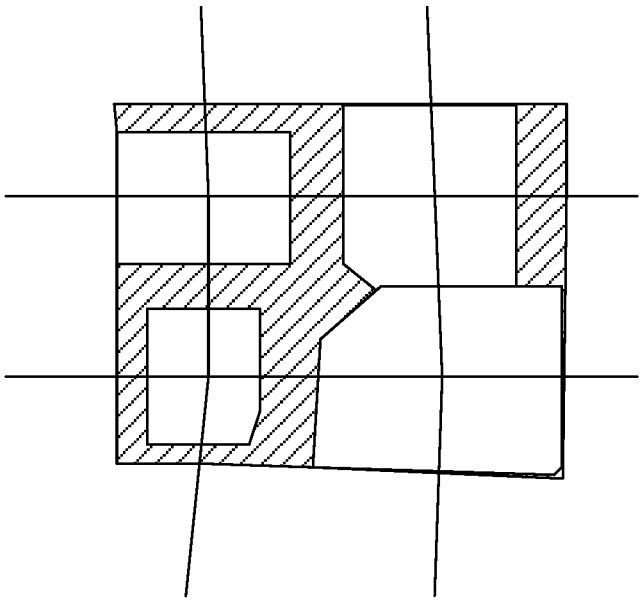
FIG. 8 is a schematic diagram of a surrounding plane of a composite node junction in another embodiment.

In an embodiment, in a case that each boundary of the junction plane of the composite node junction is expected to be perpendicular to the road plane, the computer device may further outwards fill the minimum convex polygon, so that each boundary is perpendicular to the road plane of each of the links, and the surrounding plane of the composite node junction is obtained. After the surrounding plane is obtained, the subsequent operation of integrating the surrounding plane into the road plane of the composite node junction to obtain the junction plane of the composite node junction is executed based on the surrounding plane. FIG. 8 is a schematic diagram of a surrounding plane of a composite node junction in an embodiment. Each boundary corresponding to the surrounding plane is perpendicular to the road plane of each of the links.

Figure 9:
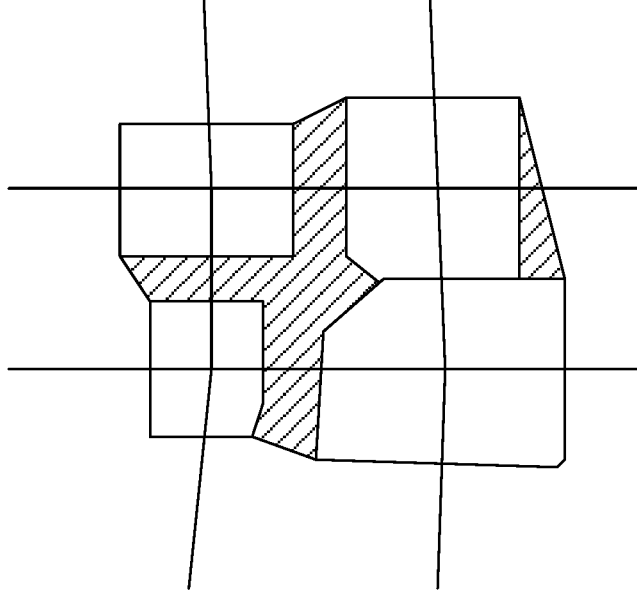
FIG. 9 is a schematic diagram of a surrounding plane of a composite node junction in yet another embodiment.

In some embodiments, the computer device may determine a maximum irregular figure capable of being formed by these shape points according to the shape points of the junction plane of each of the single-node junctions to be used as the surrounding plane of the composite node junction. Then, based on the surrounding plane, the subsequent operation of integrating the surrounding plane into the road plane of the composite node junction to obtain the junction plane of the composite node junction is executed. FIG. 9 is a schematic diagram of a surrounding plane of a composite node junction in another embodiment. The surrounding plane is an irregular figure, and the shape is abnormal.

According to the above embodiment, a manner of surrounding the junction plane of the included single-node junction has high universality and general applicability, and the primary form of the junction plane of the composite node junction may be simply and efficiently generated without relying on other additional data or complicated strategies.

Step 210: The surrounding plane is integrated into the road plane to obtain a junction plane of the composite node junction.

In this embodiment, in order to obtain the junction plane closer to the practical conditions of the junction, the computer device further processes the surrounding plane by using the road plane of the links corresponding to the composite node junctions. That is, the surrounding plane is integrated into the junction plane to obtain the junction plane of the composite node junction. Specifically, the computer device may further "trim" the surrounding plane so that the boundaries of the junction may be more accurate, smooth and nature, and the junction plane of the composite node junction closer to the practical conditions of the link may be finally obtained. Therefore, the "trim" in this embodiment of the present disclosure refers to further treatment based on the surrounding plane of the composite node junction obtained in the above operation so as to obtain the surrounding plane closer to the practical condition of the link, and the surrounding plane may be used as the junction plane of the composite node junction. Of course, in some embodiments, the computer device may directly use the surrounding plane obtained in Step 208 as the junction plane generated for the composite node junction.

Figures 10, 11:
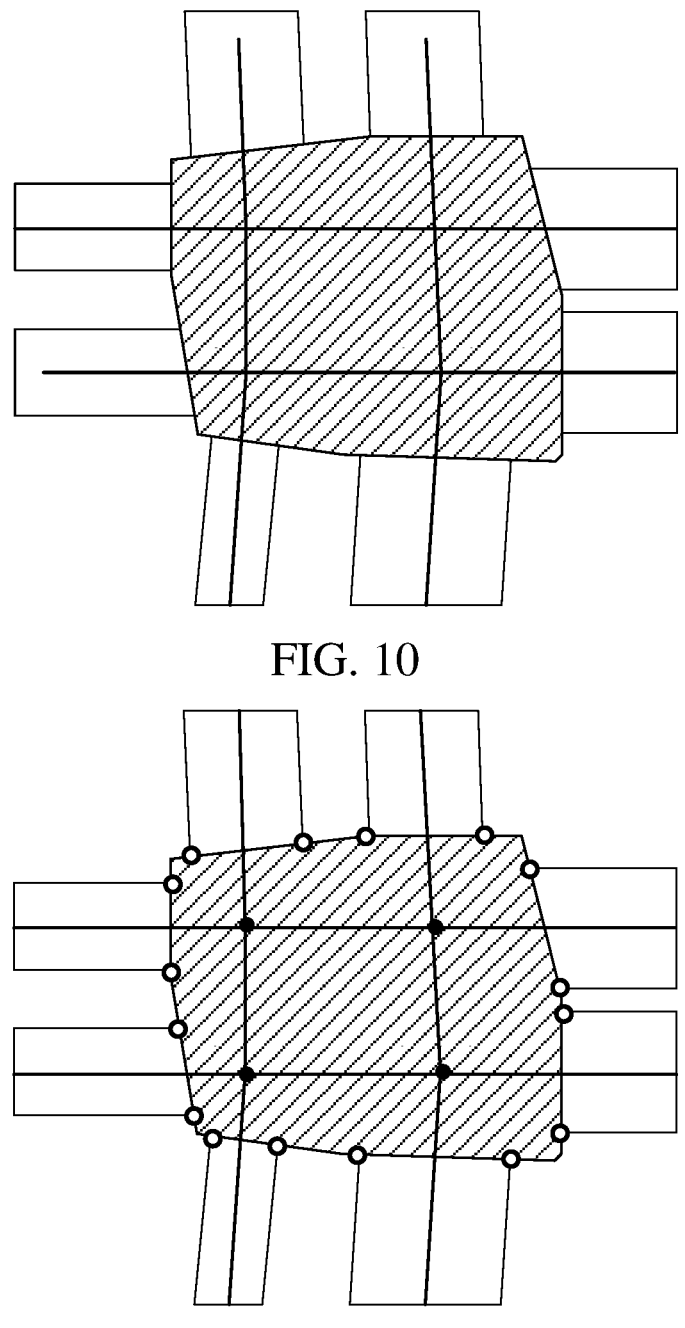
FIG. 10 is a schematic diagram of an effect of a surrounding plane and a road plane in an embodiment.
FIG. 11 is a schematic diagram of a trim point on a surrounding plane in an embodiment.

FIG. 10 is a schematic diagram of an effect of a surrounding plane and a road plane in an embodiment. The current surrounding plane is not well matched with multiple links included by the composite node junction. The surrounding plane is beyond a range of the road plane, so that the generated junction plane is not accurate enough.

Therefore, the computer device may further trim the surrounding plane.

The computer device may first determine a trim point. In this embodiment, the trim point may be an intersection point of a boundary corresponding to the surrounding plane of the composite node junction and a road plane boundary of the links included by the composite node. FIG. 11 is a schematic diagram of a trim point on a corresponding boundary of a surrounding plane in an embodiment. Referring to FIG. 11, small round white points in the figure are trim points.

Figure 12:
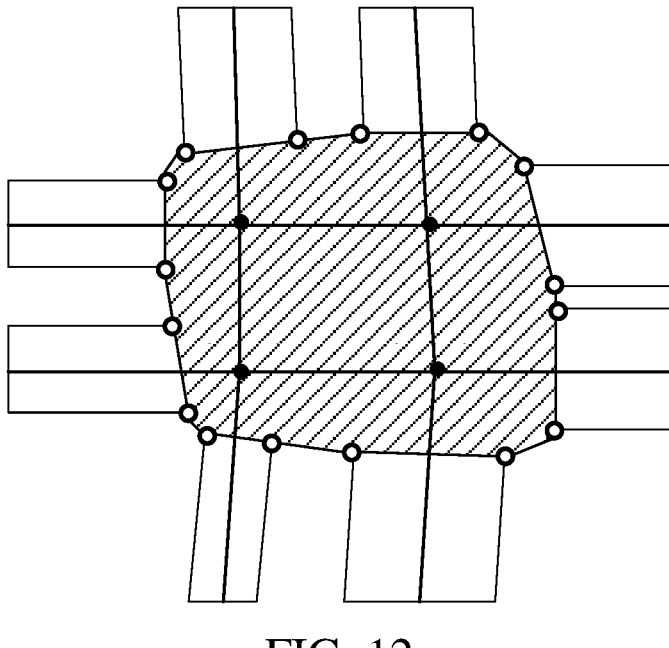
FIG. 12 is a schematic diagram of a junction plane of a composite node junction in an irregular shape in an embodiment.

In an embodiment, Step 210 may include: The road plane boundary of each of the links included by the road plane of the composite node junction is determined. The intersection point of the boundary of the surrounding plane of the composite node junction and the road plane boundary is determined to obtain the trim point set formed by the trim points of the surrounding plane. Every two adjacent trim points in the trim point set are determined. Every two adjacent trim points are connected by a straight line to obtain the junction plane of the composite node junction. FIG. 12 is a schematic diagram of a junction plane of a composite node junction in an irregular shape in an embodiment.

In an embodiment, Step 210 may further include: The road plane boundary of each of the links included by the road plane of the composite node junction is determined. The intersection point of the boundary corresponding to the surrounding plane of the composite node junction and the road plane boundary is determined to obtain the trim point set formed by the trim points of the surrounding plane. Every two adjacent trim points in the trim point set are determined. Smoothening treatment is performed between every two adjacent trim points on the surrounding plane to obtain the junction plane of the composite node junction.

The road plane boundary of each of the links included by the road plane of the composite node junction includes a road plane left side boundary and a road plane right side boundary of each of the links. The boundary corresponding to the surrounding plane of the composite node junction is also the surrounding line of the surrounding plane. The computer device may determine the trim point set, recorded as trimPoints, formed by the trim points of the surrounding plane according to the intersection of the point string expressing the surrounding line and the point string expressing the road plane boundary of each of the links.

For every two adjacent trim points on the surrounding plane, the "adjacent" refers to that the two trim points are adjacent in sequence on the surrounding plane boundary. In order to realize smooth transition between the two adjacent trim points, the sequence of the trim points needs to be determined. By resequencing the trim points, every two adjacent trim points in the trim point set are determined.

In an embodiment, the operation of determining every two adjacent trim points in the trim point set includes: A second shape point set formed by shape points of the surrounding plane is determined, and the shape points have a sequence. A left neighbor shape point and a right neighbor shape point of the trim point in the second shape point set are calculated for each of the trim points in the trim point set. Sequencing is performed for each of the trim points in the trim point set according to the corresponding sequence of target shape points, and every two adjacent trim points in the trim point set are determined according to a sequencing result. The target shape points are the left neighbor shape points or the right neighbor shape points.

The surrounding plane is in a closed shape. The closed shape is formed by multiple shape points. The shape points of the surrounding plane are folding points on the corresponding boundaries forming the surrounding plane, such as A, B and C as shown in FIG. 10. These folding points have a sequence on the boundary. The sequence may a clockwise sequence formed by using a certain folding point as a starting point, and may also be an anticlockwise sequence formed by using a certain folding point as a starting point. The second shape point set formed by these shape points may be recorded as basePoints.

For each of the trim points in the trim point set, the computer device determines a left neighbor shape point p1 and a right neighbor shape point p2 of each of the trim points in the second shape point set. That is, the computer equipment determines that the trim point is positioned between which two neighbor points (p1, p2) in the second shape point set, so that the trim points may be re-sequenced according to the sequence (may be determined by an index) of p1 on the corresponding boundary of the surrounding plane or the sequence of p2 on the corresponding boundary of the surrounding plane.

Figure 13:
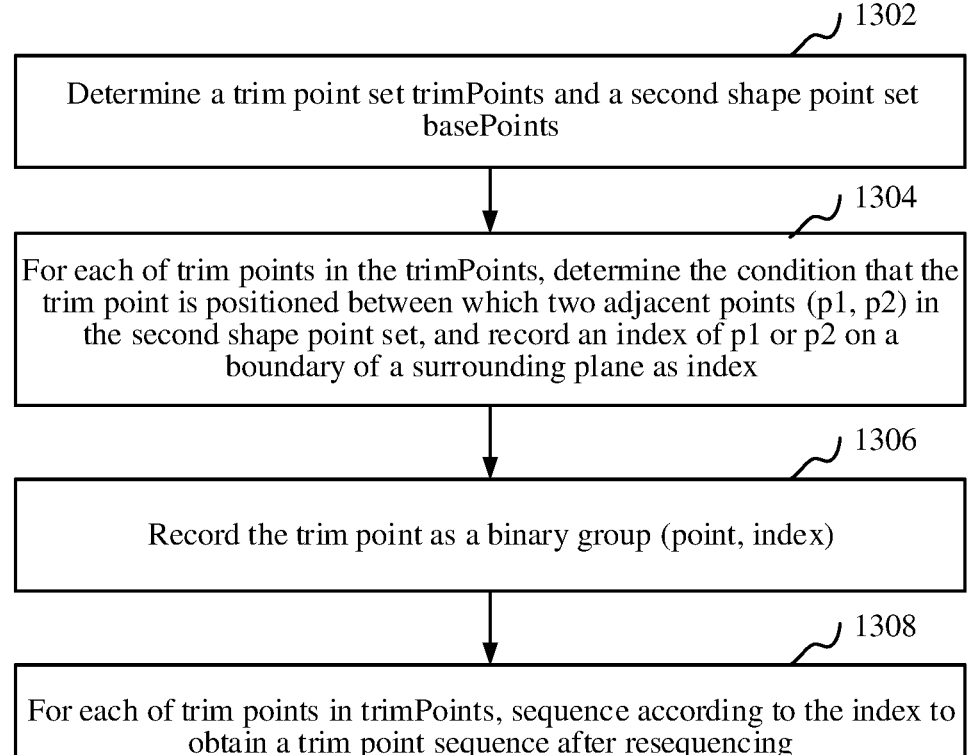
FIG. 13 is a flowchart of resequencing trim points on a surrounding plane in an embodiment.

FIG. 13 is a flowchart of resequencing trim points on a surrounding plane in an embodiment. Referring to FIG. 13, the operation of resequencing trim points includes:

Step 1302: The trim point set trimPoints and the second shape point set basePoints are determined.

Step 1304: For each of the trim points in the trimPoints, the condition that the trim point is positioned between which two neighbor points (p1, p2) in the second shape point set is determined, and the index of p1 or p2 on the boundary of the surrounding plane is recorded as index.

It may be understood that the operation of determining the condition that the trim point is positioned between which two adjacent points (p1, p2) in the second shape point set may be performed. Then, a binary group of the trim point may be obtained in a unified manner according to the index of p1 on the boundary of the surrounding plane, and a binary group of the trim point may also be obtained in a unified manner according to the index of p2 on the boundary of the surrounding plane. The indexes corresponding to two trim points may be identical. In a case that they are identical, the sequence is performed after the distances from these two points to the basePoints (index) of the shape points corresponding to the index are compared. In a case that they are different, the indexes are directly compared, and sequencing is performed directly according to the indexes.

Step 1306: The trim point is recorded as a binary group (point, index).

Step 1308: For each of the trim points in trimPoints, sequencing is performed according to the index, and a trim point sequence after resequencing is obtained.

For example, in a case that each shape point in the second shape point set basePoints is in a clockwise direction, the corresponding indexes are determined from small to large. Sequencing is performed in a unified manner according to the indexes of p1 on the boundary of the surrounding plane from small to large. Then, the indexes corresponding to the two trim points are identical, the trim point with a shorter distance from the shape point basePoints (index) corresponding to the index is ranged in a rear position, and the trim point with a longer distance is ranged in a front position.

The computer device may determine every two adjacent trim points in the trim point set after obtaining the resequenced trim point sequence.

In an embodiment, the operation of performing smoothening treatment between every two adjacent trim points on the surrounding plane includes: In a case that the two adjacent trim points are positioned on the road plane boundary of the same link of the surrounding plane, the two adjacent trim points are connected by a straight line. In a case that the two adjacent trim points are positioned on the road plane boundaries of different links of the surrounding plane, the two adjacent trim points are connected by a smooth curve.

Figure 14:
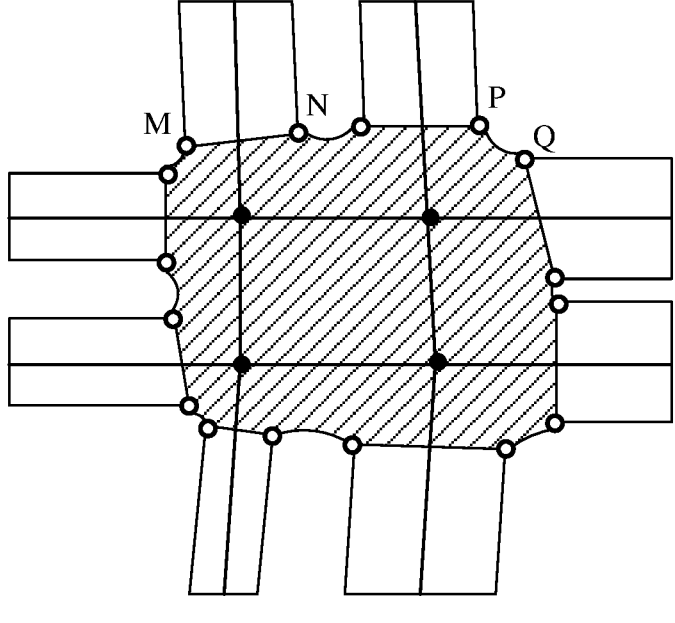
FIG. 14 is schematic diagram of an effect of smoothly connecting trim points in an embodiment.

FIG. 14 is schematic diagram of an effect of smoothly connecting trim points in an embodiment. Referring to FIG. 14, in FIG. 14, the adjacent trim points M and N are positioned on the two road plane boundaries of the same link of the surrounding plane, the trim points M and N are directly connected by a straight line. In a case that the two adjacent trim points P and Q are positioned on two road plane boundaries of different links of the surrounding plane, the two trim points P and Q are connected by a smooth curve.

In an embodiment, the smooth curve is a Bezier curve, and the operation of generating the Bezier curve between the two adjacent trim points includes: The two adjacent trim points respectively extend along the road plane boundary where the trim points are located to a direction of the single-node junctions to which the road plane boundary is connected to obtain two control points. The Bezier curve is generated according to the two adjacent trim points and the two control points.

In this embodiment of the present disclosure, for two adjacent trim points on the road plane boundary of different links of the surrounding plane, two control points are determined, a fourth-order Bezier curve is generated according to the two adjacent trim points and the two control points, and the Bezier curve may be ensured to be tangential with the road plane boundary where the two adjacent trim points are located, so that a better smooth transition effect may be obtained. In some embodiments, a control point may also be determined between the two adjacent trim points, a third-order Bezier curve is generated according to the control point and the two adjacent trim points, three control points may also be determined between the two adjacent trim points, and a fifth-order Bezier curve is generated according to the three control points and the two adjacent trim points.

Figure 15:
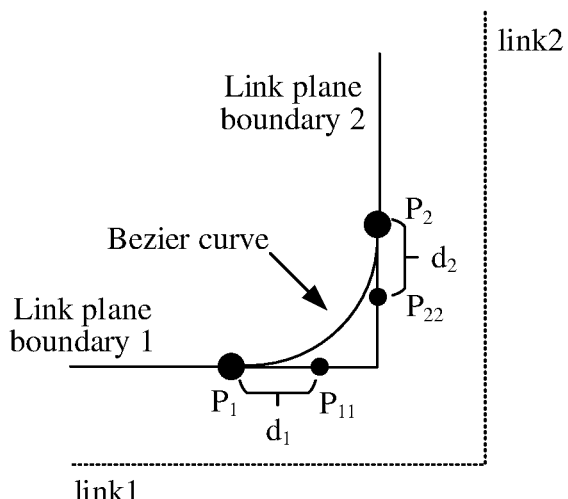
FIG. 15 is a schematic diagram of smooth connection by a Bezier curve in an embodiment.

FIG. 15 is a schematic diagram of smooth connection by a Bezier curve in an embodiment. Referring to FIG. 15, a road plane boundary 1 is a boundary at one side of the road plane of link1, and a road plane boundary 2 is a boundary at one side of the road plane of link2. P1 and P2 are respectively trim points at which a composite road plane intersects with the road plane boundary 1 and the road plane boundary 2. The computer device calculates the Bezier curve between P1 and P2 in the following manners. At this point, by taking the fourth-order Bezier curve as an example, besides P1 and P2, the two control points also needs to be additionally calculated. A calculation method is as follows: A point P11 is obtained through calculation by using a distance d1 in a direction pointed by the road plane boundary 1 from P1 to the connected single-node junction, and a point P22 is obtained through calculation by using a distance d2 in a direction pointed by the road plane boundary 2 from P2 to the connected single-node junction. Then, the computer device may calculate a point string corresponding to the Bezier curve between P1 and P2 according to the trim points P1 and P2 and the control points P11 and P22, and P1 and P2 are smoothly connected by using the point string.

Figure 16:
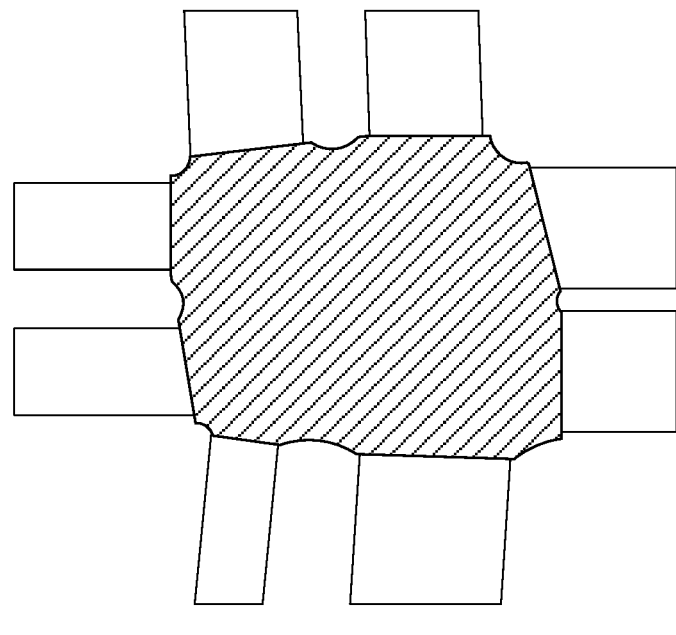
FIG. 16 is a schematic diagram of a junction plane of a composite node junction generated in an embodiment.

FIG. 16 is a schematic diagram of a junction plane of a composite node junction generated in an embodiment. Referring to FIG. 16, a closed irregular figure in FIG. 16 is the finally generated junction plane of the composite node junction. The computer device may correspondingly store the point string corresponding to the boundary line of the junction plane and the junction identification of the composite node junction to be used as attribute data of the composite node junction for other application programs or interfaces to fast use during the composite node junction display and rendering.

The generation manner of the junction plane of each of the single-node junctions included by the composite node junction will be illustrated in detail hereafter.

In an embodiment, Step 206: a junction plane of each of the at least two single-node junctions are respectively determined may include the following operations. For each of the single-node junctions, at least two links connected to each of the single-node junctions are determined. A constraint condition and an objective function are obtained. The objective function indicates a solution objective of a region size of the junction plane of each of the single-node junctions, the constraint condition indicates a constraint condition of the region size, the constraint condition includes a constraint relationship between bias variables of every two adjacent links in the at least two links, the objective function includes at least two bias variables, and each of the bias variables indicates a distance condition from each of the single-node junctions to a tangent line of the corresponding link. The objective function is solved according to the constraint condition and a road plane width of each of the at least two links to obtain a bias distance of each of the links. A junction plane of each of the single-node junctions is generated based on the road plane width of each of the links and the bias distance of each of the links.

Figure 17:
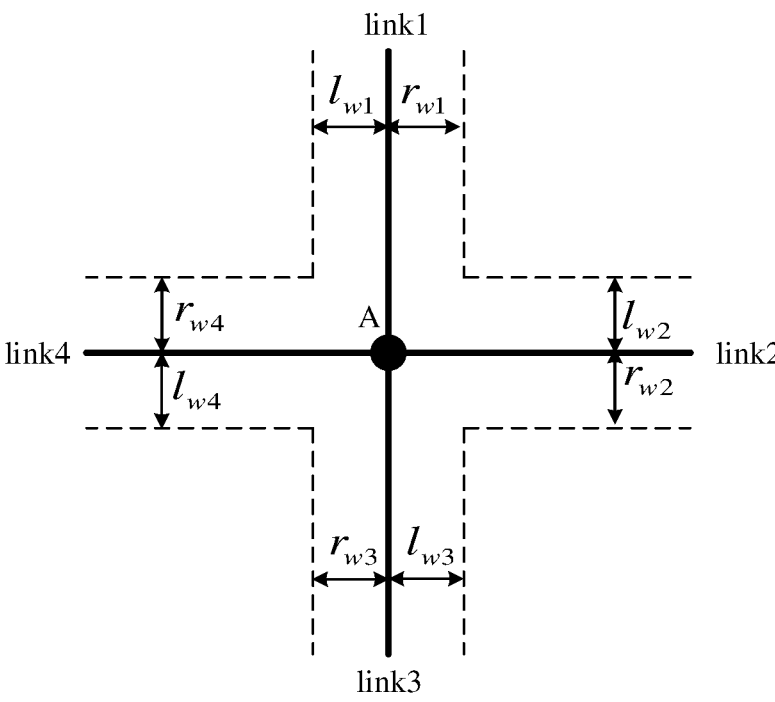
FIG. 17 is a schematic diagram of a road plane of a single-node junction in an embodiment.

FIG. 17 is a schematic diagram of a road plane of a single-node junction in an embodiment. For 4 links (link1 to link4) connected to each of the single-node junctions A, each of the links may be widened to a road plane with a certain width. For example, for link1, corresponding road plane width information includes road plane width information $(l_{w1})$ of a left side sub road plane of link1 and road plane width information $(r_{w1})$ of the right side sub road plane of link1. For link2, corresponding road plane width information also includes road plane width information $(l_{w2})$ of a left side sub road plane of link2 and road plane width information $(r_{w2})$ of the right side sub road plane of link2. Identically, for road plane width information of link3 and road plane width information of link4, it may specifically refer to the road plane width information of link1 and link2.

For each of the links, in a case that respective corresponding tangent lines of each of the links have an intersection condition, the shape abnormality of the to-be-generated junction plane of each of the single-node junctions may be caused, and the real junction plane cannot be accurately reflected. Therefore, in order to avoid the shape abnormality of the junction plane, the respective corresponding tangent lines of each of the links need to avoid the intersection condition. Each of the links will be perpendicular to the corresponding tangent line, the tangent line position may be expressed by the distance from the intersection point of the tangent line and the link to the single-node junction.

The distance from the intersection point of the tangent line and the link to the single-node junction is called as bias distance described in the subsequent content of this embodiment of the present disclosure, and whether the tangent lines corresponding to each of the links intersect with each other relies on the bias distance of each of the links. The too short bias distance of each of the links may cause the intersection of the corresponding tangent lines at the middle portions of the tangent lines, so that the shape abnormality of the junction plane may be caused.

Figure 18:
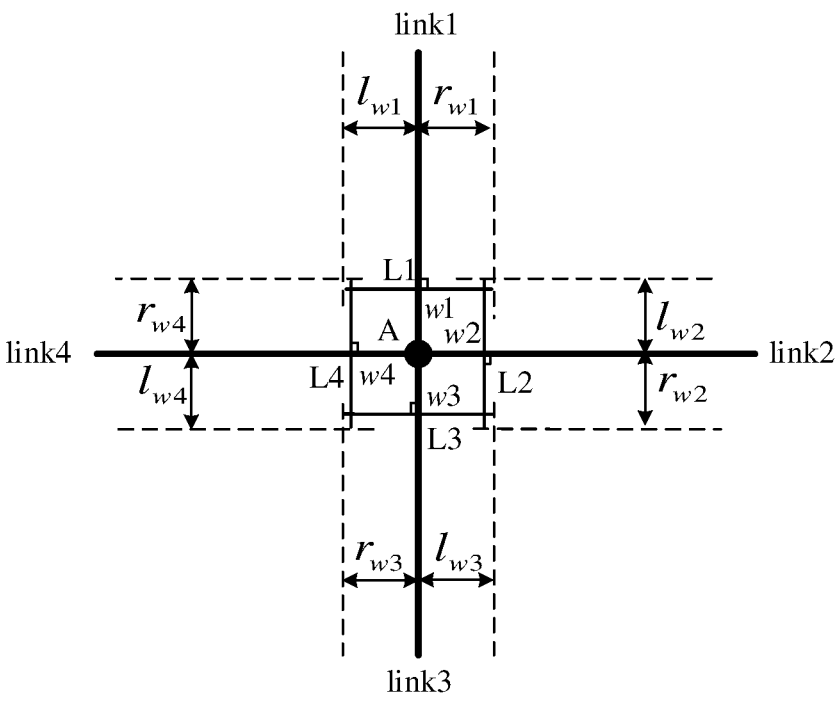
FIG. 18 is a schematic diagram of link tangent line intersection in an embodiment.

For example, FIG. 18 is a schematic diagram of tangent line intersection of links provided by an embodiment of the present disclosure. As shown in FIG. 18, the tangent line $(L_1)$ of link1 intersects with the tangent line $(L_2)$ of link2, and the intersection of $L_1$ and $L_2$ may be limited by the value of a bias variable (w1) of link1 and a value of a bias variable (w2) of the adjacent link2. Identically, $L_2$ intersects with the tangent line $(L_3)$ of link3, and the intersection may be limited by the value of w2 and a value of a bias variable (w3) of the adjacent link3. For the intersection condition of $L_3$ and the tangent line $(L_4)$ of link4 and the intersection condition of $L_4$ and $L_1$, it may refer to the intersection condition of $L_1$ and $L_2$ or the intersection condition of $L_2$ and $L_3$ for understanding, and it is not specifically repeated herein. It is to be understood that the intersection of the tangent lines of links as shown in FIG. 18 is only illustrated by taking the condition that 4 links are all in intersection as an example. In practical application, the condition that only 2 or 3 links are in intersection may also occur, and it is not limited in the present disclosure. Additionally, the bias variable may be used for indicating the distance condition from each of the single-node junctions to the tangent line of the corresponding link. For example, w1 may be used for indicating the distance condition from each of the single-node junctions A to the tangent line $L_1$ of link1. In a case that a specific value is given to the bias variable, the bias variable may also be called as a bias distance.

Based on the above, the value of w1 may influence the value of the adjacent w2, the value of w2 may influence the value of the adjacent w3, the value of w3 may influence the value of the adjacent w4, and the value of w4 may influence the value of the adjacent w1. Identically, the value of w1 may influence the value of the adjacent w4, the value of w4 may influence the value of the adjacent w3, the value of w3 may influence the value of the adjacent w2, and the value of w2 may influence the value of the adjacent w1. Significantly, regardless of the adoption of sequencing on 4 links of the same single-node junction in a clockwise manner or sequencing on 4 links in an anticlockwise manner, the coupling relationship among the bias variables w1, w2, w3 and w4 is a mutual constraint relationship. Therefore, the coupling relationship may be treated by using a mathematical optimization method in this embodiment of the present disclosure. That is, the constraint relationship among the bias variables of each of the links is changed into a constraint equation of the optimization problem.

The computer device may build the constraint condition according to the constraint relationship between the bias variables of every two adjacent links, the value of the bias variable w of each of the links is determined, and the tangent lines L of respective corresponding links do not intersect with each other or only intersect with each other at the end point. The constraint relationship between the bias variables of every two adjacent links may be built and obtained by included angle information between every two adjacent links. Exemplarily, the computer device may determine included angle information between every two adjacent links according to the road plane width information of every two adjacent links and the bias variables of the corresponding links, and then, the constraint condition may be built according to the included angle information between every two adjacent links.

The constraint condition may be built in the following manner: The road plane of each of the links respectively includes a road plane left side boundary and a road plane right side boundary, the computer device may obtain an included angle between a first link and a second link, and the first link and the second link are adjacent links in the at least two links. A first included angle between the first link and a road plane right side boundary of the first link, a second included angle between the second link and a road plane left side boundary of the second link, and a third included angle between the road plane right side boundary of the first link and the road plane left side boundary of the second link are obtained. The constraint condition is built based on the included angle between the first link and the second link, the first included angle, the second included angle and the third included angle.

Figure 19:
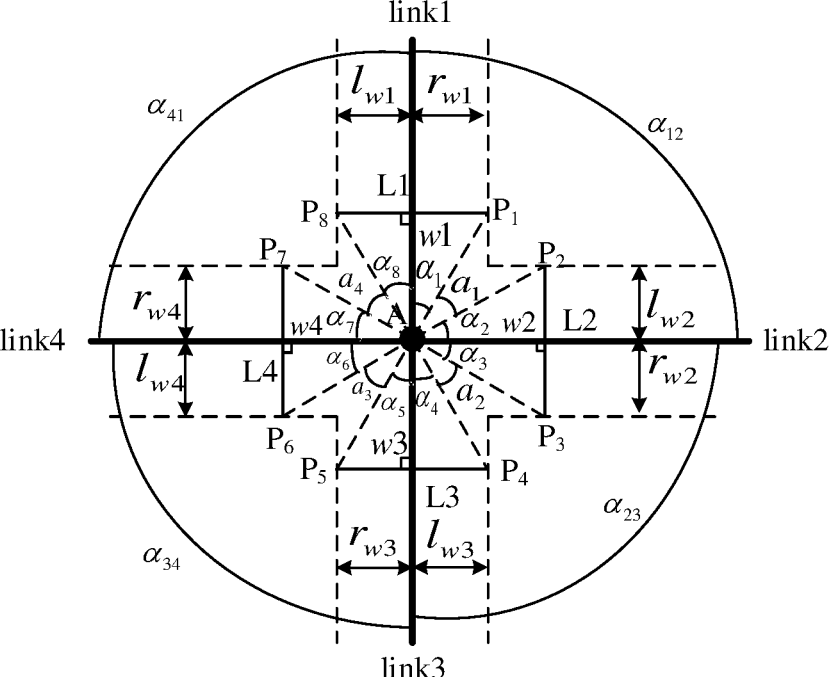
FIG. 19 is a schematic diagram that tangent lines do not intersect with each other or intersect at end points of the tangent lines in an embodiment.

By taking a right upper corner schematic diagram as shown in FIG. 19 as an example, link1 in FIG. 19 may be understood as the first link, link2 may be understood as a second link, and link1 and link2 are adjacent to each other, and are connected to a point A of the single-node junction. An intersection point of the tangent line L1 and the road plane right side boundary of link1 is P1, and an intersection point of the tangent line L2 and the road plane left side boundary of link2 is P2. By using the point A as an original point, an included angle, i.e., $\alpha_{12}$, between link1 and link2 may be obtained through calculation via the coordinate of the link shape point of link1 and the coordinate of the link shape point of link2. Identically, by using the point A as an original point, a first included angle, i.e., $\alpha_1$ may be obtained by calculating an angle between link1 and $P_1A$. Exemplarily, the tangent line L1 is perpendicular to link1, and additionally, the road plane width of the right side sub road plane of link1 is $r_{w1}$, so that the road plane width $r_{w1}$ of the right side sub road plane of link1 and the bias variable w1 of link1 may be treated through an arctan function to solve $$\alpha_1 = \arctan\frac{r_{w1}}{w1}.$$

A second included angle, i.e., $\alpha_2$ may be obtained by calculating an angle between link2 and $P_2A$. Exemplarily, the tangent line L2 is perpendicular to link2, and additionally, the road plane width of the right side sub road plane of link2 is $l_{w2}$, so that the road plane width $l_{w2}$ of the left side sub road plane of link2 and the bias variable w2 of link2 may be treated through an arctan function to solve $$\alpha_2 = \arctan\frac{l_{w2}}{w2}.$$

In order to ensure L1 and L2 not to intersect with each other or to intersect with each other only at the end point, the included angles $\alpha_1$ and $\alpha_2$ meet the following conditions:

$$\alpha_1 + \alpha_2 + \min a_1 \le \alpha_{12}, \text{ i.e.,}$$

$$\alpha_1 + \alpha_2 + \min a_1 = \arctan\frac{r_{w1}}{w1} + \arctan\frac{l_{w2}}{w2} + \min a_1 \le \alpha_{12}.$$

In the formula, min $\alpha_1$ is a minimum value of an included angle $P_1AP_2$, i.e., an included angle between the road plane right side boundary of link1 and the road plane left side boundary of link2. Additionally, $\alpha_1 \ge 0$. This is a constraint condition. In a case that there are n (n>1) links connected to each of the single-node junctions A, n constraint conditions may be built and obtained.

On the premise of meeting the described constraint conditions, it is expected at the generated junction plane of the single-node junction is as small as possible. In this case, the region size of the junction plane of each of the single-node junctions may be used as an objective function. The region size may be limited by the built and obtained constraint conditions. The objective function includes at least two bias variables. The constraint relationship between every two bias variables may be understood according to the built constraint conditions. In other words, the region size of the junction plane may be influenced by a value of the bias variable of the link connected to each of the single-node junctions. Therefore, the value size expression of the bias variable w of the link associated to the single-node junction may be used as the region size expression of the junction plane of each of the single-node junctions. For example, for the single-node junction A in FIG. 19, under the condition of using the square sum of the bias variable w as the region size expression of the junction plane, the region size of the junction plane may be expressed by: $V=w1^2+w2^2+w3^2+w4^2$. In the formula, w1, w2, w3 and w4 are bias variables of the corresponding link1, link2, link3 and link4. The expression of the region size of the junction plane may be expressed by the square sum of the bias variable. Besides this manner, in practical application, it may also be expressed by manners such as the cube sum, the N (N≥2) power sum and the absolute value sum of the bias variables. These manners are not specifically limited in this embodiment of the present disclosure.

Therefore, the objective function of the region size of the junction plane may be built, i.e., min $V=w1^2+w2^2+w3^2+w4^2$. After the constraint conditions are built and obtained, and the objective function is obtained, the objective function may be solved and calculated according to the road plane width information of the link and the constraint conditions, and the specific value of each bias variable in the objective function is further worked out. That is, the bias distance of each of the links is obtained.

Under the constraint conditions and a road plane width information of the link, the objective function may be solved based on preset constraint optimization models such as an interior point method. Exemplarily, after the road plane width information (including the road plane width information of the left side sub road plane and a road plane width information of the right side sub road plane) of each of the links is obtained, the road plane width information of each of the links may be treated through the preset constraint optimization models to further obtain the specific value of the bias variable of each of the links. That is, the optimal solution of the bias distance of each of the links is obtained. After the bias distance of each of the links is obtained through calculation, a junction plane of each of the single-node junctions may be generated based on the road plane width information of each of the links and the bias distance of the corresponding link.

According to the above manner of generating the junction plane of each of the single-node junctions, the junction plane of the junction node may be efficiently generated only by building the constraint conditions based on the constraint relationship between the bias variables of the adjacent links and calculating the bias distance of each of the links in combination with the road plane width information of the link without the rely on a complicated pure geometric algorithm.

FIG. 20 is a schematic flowchart of generating a surrounding plane in one embodiment. The method may be executed by the computer device. Referring to FIG. 20, the method includes the following steps:

Step 2002: In a case that the road network data of the at least two single-node junctions includes a same composite node junction identification, the composite node junction corresponding to the composite node junction identification formed by the at least two single-node junctions is determined.

Step 2004: Road network data of each of the single-node junctions included by the composite node junction is obtained.

Step 2006: At least two links connected to each of the single-node junctions are determined according to the road network data to obtain multiple links included by the composite node junction.

Step 2008: Corresponding link information including at least one of a link grade, a quantity of lanes, and a lane width is obtained for each of the links. A link width corresponding to each of the links is determined according to the link information. Each of the links is widened according to the corresponding link width to obtain a road plane of each of the links.

Step 2010: The road plane of the composite node junction is obtained according to the road plane of each of the links.

Step 2012: A junction plane of each of the at least two single-node junctions is respectively determined.

Step 2014: A first shape point set is obtained according to shape points included by the junction plane of each of the single-node junctions.

Step 2016: A minimum convex polygon surrounding all shape points in the first shape point set is calculated according to the first shape point set to obtain the surrounding plane of the composite node junction.

Step 2018: A road plane boundary of each of the links included by the road plane of the composite node junction is determined.

Step 2020: An intersection point of the boundary of the surrounding plane of the composite node junction and the road plane boundary is determined to obtain a trim point set formed by trim points of the surrounding plane.

Step 2022: A second shape point set formed by shape points of the surrounding plane is determined, and the shape points have a sequence.

Step 2024: A left neighbor shape point and a right neighbor shape point of the trim point in the second shape point set are calculated for each of the trim points in the trim point set.

Step 2026: Sequencing is performed for each of the trim points in the trim point set according to the corresponding sequence of target shape points, and every two adjacent trim points in the trim point set are determined according to a sequencing result. The target shape points are the left neighbor shape points or the right neighbor shape points.

Step 2028: In a case that the two adjacent trim points are positioned on the road plane boundary of the same link of the surrounding plane, the two adjacent trim points are connected by a straight line.

Step 2030: In a case that the two adjacent trim points are positioned on the road plane boundaries of different links of the surrounding plane, the two adjacent trim points are connected by a smooth curve.

Step 2032: The junction plane of the composite node junction is obtained according to the connected trim points.

The operation that the two adjacent trim points are connected by a smooth curve in Step 2030 may include: The two adjacent trim points respectively extend along the road plane boundary where the trim points are located to a direction of the single-node junctions to which the road plane boundary is connected to obtain two control points. The Bezier curve is generated according to the two adjacent trim points and the two control points. The two adjacent trim points are connected through the Bezier curve.

The operation of generating the junction plane of each of the single-node junctions in Step 2012 may include: For each of the single-node junctions, at least two links connected to each of the single-node junctions are determined. Included angle information between every two adjacent links is determined according to the road plane width of every two adjacent links and the bias variables of the corresponding links. The included angle information indicates an intersection condition between the respective corresponding tangent lines of the two adjacent links. An included angle between a first link and a second link is obtained, and the first link and the second link are adjacent links in the at least two links. A first included angle between the first link and a road plane right side boundary of the first link, a second included angle between the second link and a road plane left side boundary of the second link, and a third included angle between the road plane right side boundary of the first link and the road plane left side boundary of the second link are obtained. The constraint condition is built based on the included angle between the first link and the second link, the first included angle, the second included angle and the third included angle. An objective function is obtained. The objective function indicates a solution objective of a region size of the junction plane of each of the single-node junctions, the constraint condition indicates a constraint condition of the region size, the constraint condition includes a constraint relationship between bias variables of every two adjacent links in the at least two links, the objective function includes at least two bias variables, and each of the bias variables indicates a distance condition from each of the single-node junctions to a tangent line of the corresponding link. The objective function is solved according to the constraint condition and a road plane width of each of the at least two links to obtain a bias distance of each of the links. A junction plane of each of the single-node junctions is generated based on the road plane width of each of the links and the bias distance of each of the links.

According to the method for generating a junction plane, for a composite node junction including at least two single-node junctions, a road plane of the composite node junction only needs to be obtained according to junction information of the composite node junction. A surrounding plane of the composite node junction is generated according to the junction plane of each of the included single-node junctions. Then, the surrounding plane is trimmed into the road plane, and the junction plane of the composite node junction may be obtained. The surrounding plane may be simply and effectively generated at high quality on the premise of relying little original data, and no complicated calculative strategy needs to be introduced, so that an extreme case is avoided, and the robustness is high.

The method for generating a junction plane provided by this embodiment of the present disclosure may be applied to any one scene needing to generate the junction plane of the composite node junction according to the original road network data. For example, in a high-precision map, in a case that some regions are lack of corresponding high-precision data, the corresponding junction plane may be generated for the composite node junction in these regions by using ordinary map data and using the method for generating a junction plane provided by this embodiment of the present disclosure. For another example, the junction plane of the composite node junction may be efficiently generated under the condition of only relying on the original ordinary map data rather than relying on other path indication information. For another example, the generated junction plane of the composite node junction may be called by a map application, and then, the junction plane may be directly rendered and displayed according to the point string data of the junction plane. For another example, for a game application involving an urban link model, corresponding game images may be directly rendered and displayed according to the point string data of the junction plane in the urban link model. Of course, applicable scenes are not limited to the above examples.

Detail illustration will be provided hereafter by taking a scene as an example.

In a high-precision map, some regions are lack of corresponding high-precision data, the method for generating a junction plane provided by this embodiment of the present disclosure may be used based on ordinary map data to solve the problem that the junction plane of the high-precision map cannot be rendered or displayed in the above regions.

The computer device may find out the regions being lack of the high-precision map in the map in advance, such as regions within the fifth ring in a certain city. Then, the respective original road network data for generating an ordinary map of the links in these regions is obtained. In the road network data of the ordinary map, the link is a segment without a width, and is expressed by a group of data points (link), and this group of data points may also be called as a point string. The road network data of the link further includes link information. In a case that the road network data of multiple links includes the same single-point junction identification, the multiple links form a single-node junction. For each of the single-node junctions, the computer device may generate a junction plane of each of the single-node junctions, the junction plane is generated to generate a shape point coordinate of the link, the junction plane of each of the single-node junctions is actually expressed by a group of data points, each data point is a coordinate, and the group of data points may form a closed polygon. For the single-node junction in these regions, the computer device may generate the corresponding junction plane. The junction plane is mainly generated to generate the shape point coordinate of the junction plane boundaries. In a high-precision map, the shape point coordinates of these boundaries are generally and directly given from original data provided at the upper stream.

In a case that the road network data of multiple single-node junctions includes a same composite node junction identification, the multiple single-node junctions form a composite node junction. For such a composite node junction, the computer device may generate the corresponding junction plane. The operation specifically includes: Multiple single-node junctions included by the composite node junction are determined. For each of the single-node junctions, at least two links connected to each of the single-node junctions are determined according to the corresponding road network data. Therefore, multiple links included by the composite node junction may be obtained. As mentioned above, the link is a segment without a width. For each of the links, the computer device obtains the corresponding link information, a link width corresponding to each of the links is determined according to the link information. Each of the links is widened according to the corresponding link width to obtain the road plane of the link. The road plane of the link respectively includes a road plane left side boundary and a road plane right side boundary. Therefore, the road plane is expressed by three segments: an original group of data points (link), point string data expressing the road plane left side boundary, and point string data expressing the road plane right side boundary. Then, the computer device obtains the junction plane of each of the single-node junctions in the composite node junction. The junction plane of each of the single-node junctions is a group of data points. This group of data points may be a closed polygon. The computer device calculates a minimum convex polygon surrounding these shape points according to the shape points included by the junction plane of each of the single-node junctions to obtain the surrounding plane of the composite node junction. The junction plane of the composite node junction is actually a group of data points. This group of data points may form a closed polygon. Then, the computer device determines the road plane boundaries of each of the links included by the road plane of the composite node junction, determines the trim point set formed by the trim points on the surrounding plane according to the intersection of the point string data expressing the road plane boundaries and the point string data expressing the boundaries of the surrounding plane of the composite node junction, and sequences these trim points according to the sequence of the trim points on the boundaries of the surrounding plane, so that every two adjacent trim points in the trim point sets are determined. Further, for the trim points on the surrounding plane, the computer device connects the two adjacent trim points on the road plane boundary of the same link by a straight line, and connects the two adjacent trim points on the road plane boundary of different links by a smooth curve to obtain a final junction plane.

For the above regions being lack of high-precision data, the computer device may store the point string data expressing the junction plane of each of the single-node junctions, the point string data expressing the junction plane of the composite node junction, etc. into a map database in advance to be used as the supplementation of the high-precision map data required in these regions for rendering and displaying the high-precision map of these regions.

Therefore, in a map navigation process, in a case that a terminal or a vehicle is located to currently move to a position near a certain composite node junction in the above regions, and the junction plane of the composite node junction needs to be displayed, a map application on the terminal or a vehicle-mounted terminal may directly call the point string data expressing the junction plane of the composite node junction from the map database, and the high-precision map navigation image in the current position may be efficiently rendered and displayed according to the called point string data.

It is to be understood that although the steps are displayed sequentially according to the instructions of the arrows in the flowcharts of the embodiments, these steps are not necessarily executed sequentially according to the sequence instructed by the arrows. Unless otherwise explicitly specified in the present disclosure, the execution sequence of the steps is not strictly limited, and the steps may be executed in other sequences. Moreover, at least some of the steps in the flowcharts in each embodiment may include multiple sub-steps or multiple stages. The sub-steps or stages are not necessarily executed at the same moment but may be executed at different moments. Execution of the sub-steps or stages is not necessarily sequentially executed, but may be executed alternately with other steps or at least some of sub-steps or stages of other steps.

Based on the same invention idea, an embodiment of the present disclosure further provides an apparatus for generating a junction plane, which implements the method for generating a junction plane. The apparatus provides a problem solving solution similar to a solution recorded in the method. Therefore, for specific limitation in embodiments of one or more apparatuses for generating a junction plane provided hereafter, refer to the limitation of the method for generating a junction plane above, and it will not be repeated herein.

Figure 21:
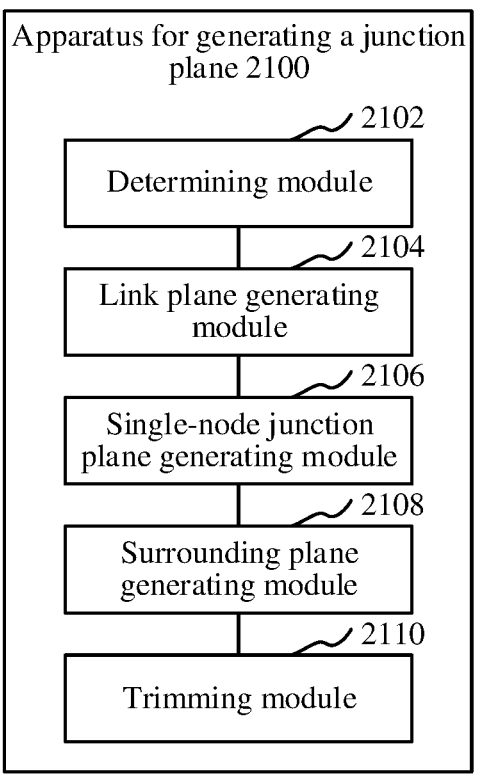
FIG. 21 is a structural block diagram of an apparatus for generating a junction plane in an embodiment.

In an embodiment, as shown in FIG. 21, an apparatus 2100 for generating a junction plane is provided. The apparatus includes: a determining module 2102, a road plane generating module 2104, a single-node junction plane generating module 2106, a surrounding plane generating module 2108 and an integrating module 2110.

The determining module 2102 is configured to determine a composite node junction. The composite node junction includes at least two single-node junctions.

The road plane generating module 2104 is configured to obtain a road plane of the composite node junction according to junction information of the composite node junction.

The single-node junction plane generating module 2106 is configured to respectively determine a junction plane of each of the at least two single-node junctions.

The surrounding plane generating module 2108 is configured to generate a surrounding plane of the composite node junction according to the junction plane of each of the single-node junctions.

The integrating module 2110 is configured to integrate the surrounding plane into the road plane to obtain a junction plane of the composite node junction.

In an embodiment, the determining module 2102 is further configured to determine the composite node junction corresponding to the composite node junction identification formed by the at least two single-node junctions in a case that the road network data of the at least two single-node junctions includes a same composite node junction identification.

In an embodiment, the road plane generating module 2104 is further configured to obtain road network data of each of the single-node junctions included by the composite node junction, determine at least two links connected to each of the single-node junctions according to the road network data to obtain multiple links included by the composite node junction, obtain corresponding link information including at least one of a link grade, a quantity of lanes, and a lane width for each of the links, determine a link width corresponding to each of the links according to the link information, and widen each of the links according to the corresponding link width to obtain a road plane of each of the links, and obtain the road plane of the composite node junction according to the road plane of each of the links.

In an embodiment, the single-node junction plane generating module 2106 is further configured to determine at least two links connected to each of the single-node junctions for each of the single-node junctions, obtain a constraint condition and an objective function, where the objective function indicates a solution objective of a region size of the junction plane of each of the single-node junctions, the constraint condition indicates a constraint condition of the region size, the constraint condition includes a constraint relationship between bias variables of every two adjacent links in the at least two links, the objective function includes at least two bias variables, and each of the bias variables indicates a distance condition from each of the single-node junctions to a tangent line of the corresponding link, solve the objective function according to the constraint condition and a road plane width of each of the at least two links to obtain a bias distance of each of the links, and generate a junction plane of each of the single-node junctions based on the road plane width of each of the links and the bias distance of each of the links.

In an embodiment, the single-node junction plane generating module 2106 is further configured to determine included angle information between every two adjacent links according to the road plane width of every two adjacent links and the bias variables of the corresponding links, where the included angle information indicates an intersection condition between the respective corresponding tangent lines of the two adjacent links, and build the constraint condition according to the included angle information between every two adjacent links.

In an embodiment, the single-node junction plane generating module 2106 is further configured to obtain an included angle between a first link and a second link, where the first link and the second link are adjacent links in the at least two links, obtain a first included angle between the first link and a road plane right side boundary of the first link, a second included angle between the second link and a road plane left side boundary of the second link, and a third included angle between the road plane right side boundary of the first link and the road plane left side boundary of the second link, and build the constraint condition based on the included angle between the first link and the second link, the first included angle, the second included angle and the third included angle.

In an embodiment, the surrounding plane generating module 2108 is further configured to obtain a first shape point set according to shape points included by the junction plane of each of the single-node junctions, and calculate a minimum convex polygon surrounding all shape points in the first shape point set according to the first shape point set to obtain the surrounding plane of the composite node junction.

In an embodiment, the integrating module 2110 is further configured to determine a road plane boundary of each of the links included by the road plane of the composite node junction, determine an intersection point of the boundary of the surrounding plane of the composite node junction and the road plane boundary to obtain a trim point set formed by trim points of the surrounding plane, determine every two adjacent trim points in the trim point set, and perform smoothening treatment between every two adjacent trim points on the surrounding plane to obtain the junction plane of the composite node junction.

In an embodiment, the integrating module 2110 is further configured to determine a second shape point set formed by shape points of the surrounding plane (the shape points have a sequence), calculate a left neighbor shape point and a right neighbor shape point of the trim point in the second shape point set for each of the trim points in the trim point set, perform sequencing for each of the trim points in the trim point set according to the corresponding sequence of target shape points, and determine every two adjacent trim points in the trim point set according to a sequencing result. The target shape points are the left neighbor shape points or the right neighbor shape points.

In an embodiment, the smooth curve is a Bezier curve. The integrating module 2110 is further configured to respectively extend the two adjacent trim points along the road plane boundary where the trim points are located to a direction of the single-node junctions to which the road plane boundary is connected to obtain two control points, and generate the Bezier curve according to the two adjacent trim points and the two control points.

Each module in the apparatus 2100 for generating a junction plane may be implemented entirely or partially through software, hardware, or a combination thereof. Each of the above modules may be embedded into or independent from the processor in the computer device in a hardware form, and may be stored in a memory in the computer device in a software form so that the processor may conveniently call and execute the corresponding operation of each of the modules. Moreover, each module can be part of an overall module that includes the functionalities of the module.

According to the apparatus 2100 for generating a junction plane, for a composite node junction including at least two single-node junctions, a road plane of the composite node junction only needs to be obtained according to junction information of the composite node junction. A surrounding plane of the composite node junction is generated according to the junction plane of each of the included single-node junctions. Then, the surrounding plane is trimmed into the road plane, and the junction plane of the composite node junction may be obtained. The surrounding plane may be simply and effectively generated at high quality on the premise of relying little original data, and no complicated calculative strategy needs to be introduced, so that an extreme case is avoided, and the robustness is high.

Figure 22:
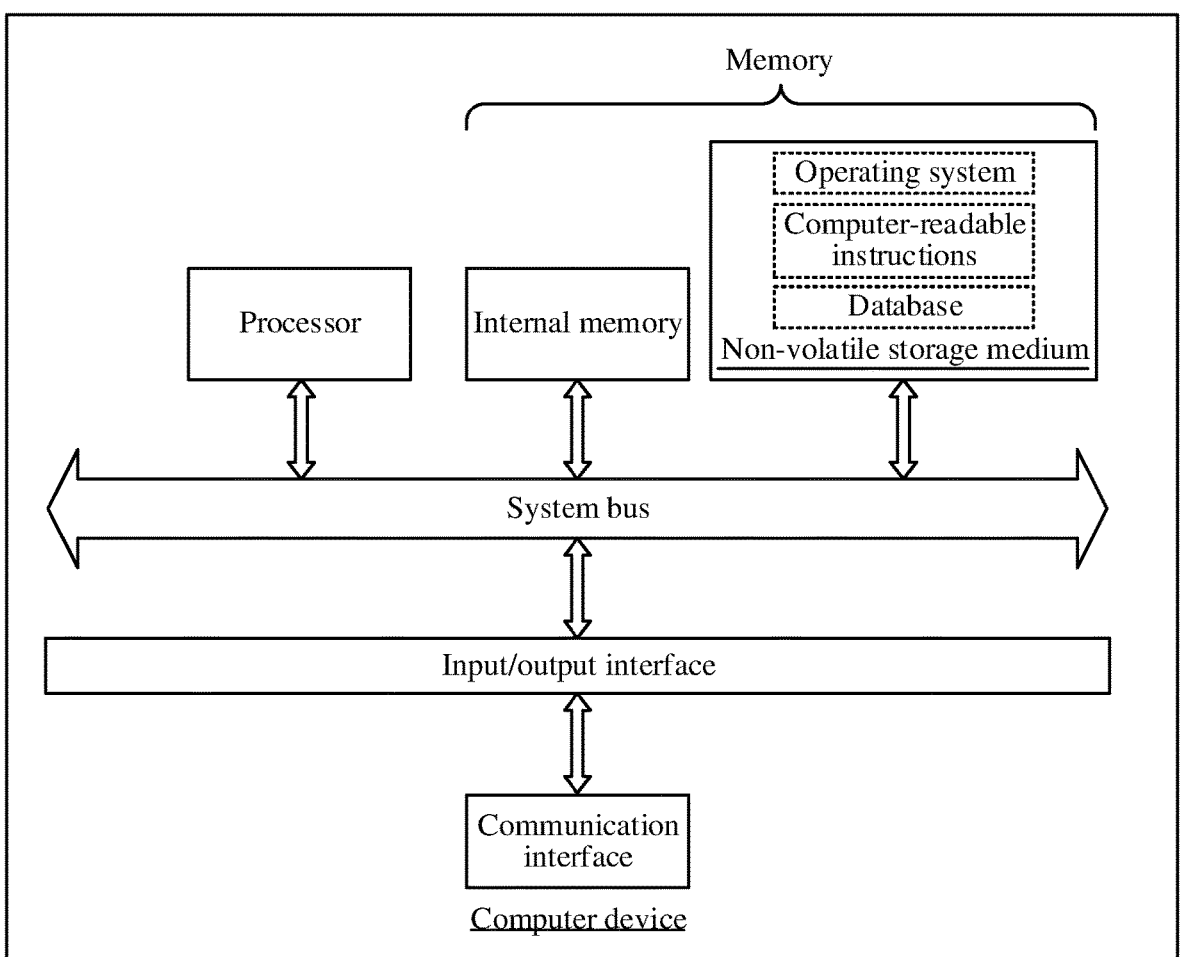
FIG. 22 is a diagram of an internal structure of a computer device in an embodiment.

In an embodiment, a computer device is provided. The computer device may be a server 104 as shown in FIG. 1, and its internal structure diagram may be as shown in FIG. 22. The computer device includes a processor, a memory, an input/output (I/O) interface and a communication interface. The processor, the memory and the input/output interface are connected through a system bus, and the communication interface is connected to the system bus through the input/output interface. The processor of the computer device is configured to provide computation and control ability. The memory of the computer device includes a non-volatile storage medium and an internal memory. The non-volatile storage medium stores an operating system, computer-readable storage instructions and a database. The memory provides an environment for running the operating system and the computer-readable storage instructions in the non-volatile storage medium. The database of the computer device is configured to store road network data. The input/output interface of the computer device is configured to exchange information between the processor and an external device. The communication interface of the computer device is configured to connect to and communicate with an external terminal by using a network. The computer-readable storage instructions are executed by the processor to implement a method for generating a junction plane.

A person skilled in the art may understand that, the structure shown in FIG. 22 is merely a block diagram of a partial structure related to a solution in the present disclosure, and does not constitute a limitation to the computer device to which the solution in the present disclosure is applied. Specifically, the computer device may include more components or fewer components than those shown in the figure, or some components may be combined, or a different component deployment may be used.

In an embodiment, a computer device is provided, and includes a memory and a processor. The memory stores computer-readable storage instructions, and the steps of the method for generating a junction plane provided by one or multiple embodiments of the present disclosure are implemented in a case that the computer-readable storage instructions are executed by the processor.

In an embodiment, a computer-readable storage medium is provided, and stores computer-readable storage instructions. The steps of the method for generating a junction plane provided by one or more embodiments of the present disclosure are implemented in a case that the computer-readable storage instructions are executed by a processor.

In an embodiment, a computer program product is provided, and includes computer-readable storage instructions. The steps of the method for generating a junction plane provided by one or more of embodiments of the present disclosure are implemented in a case that the computer-readable storage instructions are executed by a processor.

The user information (including but not limited to user equipment information, user personal information, etc.) and data (including but not limited to data used for analysis, stored data, displayed data, etc.) involved in the present disclosure are all information and data authorized by the user or fully authorized by all parties, and the collection, use and processing of relevant data shall comply with relevant laws, regulations and standards of relevant countries and regions.

A person of ordinary skill in the art may understand that all or some of procedures of the method in the foregoing embodiments may be implemented by instructing relevant hardware through computer-readable storage instructions. The computer-readable storage instructions may be stored in a non-volatile computer-readable storage medium. In a case that the computer-readable storage instructions are executed, the procedures of the foregoing method embodiments may be implemented. References to the memory, the database or other medium used in the embodiments provided in the present disclosure may all include at least one of a non-volatile memory or a volatile memory. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, etc. The volatile memory may include a random access memory (RAM) or an external cache memory, etc. As illustration but not limitation, the RAM may be in various forms, such as a static random access memory (SRAM) or a dynamic random access memory (DRAM). The database in each embodiment provided by the present disclosure may include at least one of a relational database and a non-relational database. The non-relational database may include but is not limited to a blockchain-based distributive database, etc. The processor in each embodiment provided by the present disclosure may be but is not limited to a universal processor, a central processing unit, a graphics processor, a digital signal processor, a programmable logic processor, a data processing logic processor based on quantum computation, etc.

Technical features of the foregoing embodiments may be combined in different manners to form other embodiments. To make description concise, not all possible combinations of the technical features in the foregoing embodiments are described. However, the combinations of these technical features shall be considered as falling within the scope recorded by this specification provided that no conflict exists.

The foregoing embodiments show only several implementations of the present disclosure and are described in detail, which, however, are not to be construed as a limitation to the patent scope of the present disclosure. For a person of ordinary skill in the art, several transformations and improvements can be made without departing from the idea of the present disclosure. These transformations and improvements belong to the protection scope of the present disclosure. Therefore, the protection scope of the present disclosure shall be subject to the appended claims.

What is claimed is:

1. A method for generating a junction plane of a composite node junction, executed by a computer device, and comprising:

determining the composite node junction comprising at least two single-node junctions according to road network data;

obtaining a road plane of the composite node junction according to junction information of the composite node junction;

respectively determining a junction plane of each of the at least two single-node junctions, wherein the respectively determining the junction plane of each of the at least two single-node junctions comprises: for each of the single-node junctions, determining at least two links connected to each of the single-node junctions; obtaining a constraint condition and an objective function, wherein the objective function indicates a solution objective of a region size of the junction plane of each of the single-node junctions, the constraint condition indicates a constraint condition of the region size, the constraint condition comprises a constraint relationship between bias variables of every two adjacent links in the at least two links, the objective function comprises at least two bias variables, and each of the bias variables indicates a distance condition from each of the single-node junctions to a tangent line of the corresponding link; solving the objective function according to the constraint condition and a road plane width of each of the at least two links to obtain a bias distance of each of the links; and generating the junction plane of each of the single-node junctions based on the road plane width of each of the links and the bias distance of each of the links;

generating a surrounding plane of the composite node junction according to the junction plane of each of the single-node junctions;

integrating the surrounding plane into the road plane to obtain the junction plane of the composite node junction; and autonomously driving a vehicle based at least in part on the junction plane of the composite node junction.

2. The method according to claim 1, wherein the determining the composite node junction comprises:

obtaining road network data of each of the single-node junctions; and in a case that the road network data of each of the at least two single-node junctions comprises a same composite node junction identification, determining that the at least two single-node junctions form the composite node junction.

3. The method according to claim 1, wherein the obtaining the road plane of the composite node junction according to the junction information of the composite node junction comprises:

obtaining road network data of each of the single-node junctions comprised by the composite node junction;

determining at least two links connected to each of the single-node junctions according to the road network data to obtain a plurality of links comprised by the composite node junction;

for each of the links, obtaining corresponding link information comprising at least one of a link grade, a quantity of lanes, and a lane width; determining a link width corresponding to each of the links according to the link information, and widening each of the links according to the corresponding link width to obtain a road plane of each of the links; and obtaining the road plane of the composite node junction according to the road plane of each of the links.

4. The method according to claim 1, wherein the obtaining the constraint condition comprises:

determining included angle information between every two adjacent links according to the road plane width of every two adjacent links and the bias variables of the corresponding links, the included angle information indicating an intersection condition between the respective corresponding tangent lines of the two adjacent links; and

building the constraint condition according to the included angle information between every two adjacent links.

5. The method according to claim 4, wherein the road plane of each of the links comprises a road plane left side boundary and a road plane right side boundary, and the building the constraint condition according to the included angle information between every two adjacent links comprises:

obtaining an included angle between a first link and a second link, the first link and the second link being adjacent links in the at least two links;

obtaining a first included angle between the first link and a road plane right side boundary of the first link, a second included angle between the second link and a road plane left side boundary of the second link, and a third included angle between the road plane right side boundary of the first link and the road plane left side boundary of the second link; and building the constraint condition based on the included angle between the first link and the second link, the first included angle, the second included angle and the third included angle.

6. The method according to claim 1, wherein the generating the surrounding plane of the composite node junction according to the junction plane of each of the single-node junctions comprises:

obtaining a first shape point set according to shape points comprised by the junction plane of each of the single-node junctions; and according to the first shape point set, calculating a minimum convex polygon surrounding all shape points in the first shape point set to obtain the surrounding plane of the composite node junction.

7. The method according to claim 1, wherein the integrating the surrounding plane into the road plane to obtain the junction plane of the composite node junction comprises:

determining a road plane boundary of each of the links comprised by the road plane of the composite node junction;

determining an intersection point of the boundary of the surrounding plane of the composite node junction and the road plane boundary to obtain a trim point set formed by trim points of the surrounding plane;

determining every two adjacent trim points in the trim point set; and performing smoothening treatment between every two adjacent trim points on the surrounding plane to obtain the junction plane of the composite node junction.

8. The method according to claim 7, wherein the determining every two adjacent trim points in the trim point set comprises:

determining a second shape point set formed by shape points of the surrounding plane, the shape points having a sequence;

for each of the trim points in the trim point set, calculating a left neighbor shape point and a right neighbor shape point of the trim point in the second shape point set; and for each of the trim points in the trim point set, performing sequencing according to the corresponding sequence of target shape points, and determining every two adjacent trim points in the trim point set according to a sequencing result, the target shape points being the left neighbor shape points or the right neighbor shape points.

9. The method according to claim 7, wherein the performing smoothening treatment between every two adjacent trim points on the surrounding plane comprises:

in a case that the two adjacent trim points are positioned on the road plane boundary of the same link of the surrounding plane, connecting the two adjacent trim points by a straight line; and in a case that the two adjacent trim points are positioned on the road plane boundaries of different links of the surrounding plane, connecting the two adjacent trim points by a smooth curve.

10. The method according to claim 9, wherein the smooth curve is a Bezier curve, and an operation of generating the Bezier curve between the two adjacent trim points comprises:

respectively extending the two adjacent trim points along the road plane boundary where the trim points are located to a direction of the single-node junctions to which the road plane boundary is connected to obtain two control points; and generating the Bezier curve according to the two adjacent trim points and the two control points.

11. An apparatus for generating a junction plane of a composite node junction, comprising:

at least one memory and at least one processor, wherein the at least one memory stores computer-readable storage instructions, and the at least one processor is configured, when executing the computer-readable storage instructions, to:

determine the composite node junction comprising at least two single-node junctions according to road network data;

obtain a road plane of the composite node junction according to junction information of the composite node junction;

respectively determine a junction plane of each of the at least two single-node junctions, wherein the respectively determining the junction plane of each of the at least two single-node junctions comprises: for each of the single-node junctions, determining at least two links connected to each of the single-node junctions; obtaining a constraint condition and an objective function, wherein the objective function indicates a solution objective of a region size of the junction plane of each of the single-node junctions, the constraint condition indicates a constraint condition of the region size, the constraint condition comprises a constraint relationship between bias variables of every two adjacent links in the at least two links, the objective function comprises at least two bias variables, and each of the bias variables indicates a distance condition from each of the single-node junctions to a tangent line of the corresponding link; solving the objective function according to the constraint condition and a road plane width of each of the at least two links to obtain a bias distance of each of the links; and generating the junction plane of each of the single-node junctions based on the road plane width of each of the links and the bias distance of each of the links;

generate a surrounding plane of the composite node junction according to the junction plane of each of the single-node junctions;

integrate the surrounding plane into the road plane to obtain the junction plane of the composite node junction; and autonomously drive a vehicle based at least in part on the junction plane of the composite node junction.

12. The apparatus according to claim 11, wherein the at least one processor is further configured to:

obtaining road network data of each of the single-node junctions; and in a case that the road network data of each of the at least two single-node junctions comprises a same composite node junction identification, determining that the at least two single-node junctions form the composite node junction.

13. The apparatus according to claim 11, wherein the at least one processor is further configured to:

obtain road network data of each of the single-node junctions comprised by the composite node junction;

determine at least two links connected to each of the single-node junctions according to the road network data to obtain a plurality of links comprised by the composite node junction;

obtain corresponding link information comprising at least one of a link grade, a quantity of lanes, and a lane width for each of the links, determine a link width corresponding to each of the links according to the link information, and widen each of the links according to the corresponding link width to obtain a road plane of each of the links; and obtain the road plane of the composite node junction according to the road plane of each of the links.

14. The apparatus according to claim 11, wherein the at least one processor is further configured to:

obtain a first shape point set according to shape points comprised by the junction plane of each of the single-node junctions, and according to the first shape point set; and calculate a minimum convex polygon surrounding all shape points in the first shape point set to obtain the surrounding plane of the composite node junction.

15. The apparatus according to claim 11, wherein the at least one processor is further configured to:

determine a road plane boundary of each of the links comprised by the road plane of the composite node junction;

determine an intersection point of the boundary of the surrounding plane of the composite node junction and the road plane boundary to obtain a trim point set formed by trim points of the surrounding plane;

determine every two adjacent trim points in the trim point set; and perform smoothening treatment between every two adjacent trim points on the surrounding plane to obtain the junction plane of the composite node junction.

16. The apparatus according to claim 15, wherein the at least one processor is further configured to:

determine a second shape point set formed by shape points of the surrounding plane, the shape points having a sequence, calculate a left neighbor shape point and a right neighbor shape point of the trim point in the second shape point set for each of the trim points in the trim point set, and perform sequencing for each of the trim points in the trim point set according to the corresponding sequence of target shape points, and determine every two adjacent trim points in the trim point set according to a sequencing result, the target shape points being the left neighbor shape points or the right neighbor shape points.

17. The apparatus according to claim 11, wherein the at least one processor is further configured to connect the two adjacent trim points by a straight line in a case that the two adjacent trim points are positioned on the road plane boundary of the same link of the surrounding plane, and connect the two adjacent trim points by a smooth curve in a case that the two adjacent trim points are positioned on the road plane boundaries of different links of the surrounding plane.

18. A non-transitory computer-readable storage medium, storing computer-readable storage instructions, wherein the computer-readable storage instructions, when being executed by at least one processor, cause the at least one processor to perform:

determining a composite node junction comprising at least two single-node junctions according to road network data;

obtaining a road plane of the composite node junction according to junction information of the composite node junction;

respectively determining a junction plane of each of the at least two single-node junctions, wherein the respectively determining the junction plane of each of the at least two single-node junctions comprises: for each of the single-node junctions, determining at least two links connected to each of the single-node junctions; obtaining a constraint condition and an objective function, wherein the objective function indicates a solution objective of a region size of the junction plane of each of the single-node junctions, the constraint condition indicates a constraint condition of the region size, the constraint condition comprises a constraint relationship between bias variables of every two adjacent links in the at least two links, the objective function comprises at least two bias variables, and each of the bias variables indicates a distance condition from each of the single-node junctions to a tangent line of the corresponding link; solving the objective function according to the constraint condition and a road plane width of each of the at least two links to obtain a bias distance of each of the links; and generating the junction plane of each of the single-node junctions based on the road plane width of each of the links and the bias distance of each of the links;

generating a surrounding plane of the composite node junction according to the junction plane of each of the single-node junctions;

integrating the surrounding plane into the road plane to obtain the junction plane of the composite node junction; and autonomously driving a vehicle based at least in part on the junction plane of the composite node junction.

\* \* \* \* \*